(12) United States Patent
Uppala et al.

(10) Patent No.: US 7,787,826 B2
(45) Date of Patent: Aug. 31, 2010

(54) METHODS AND APPARATUS FOR TRANSITIONING BETWEEN STATES

(75) Inventors: Sathyadev Venkata Uppala, Whitehouse Station, NJ (US); Murari Srinivasan, Palo Alto, CA (US); Pablo Anigstein, Gillette, NJ (US); Rakesh Dugad, Milburn, NJ (US); Rajiv Laroia, Far Hills, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 923 days.

(21) Appl. No.: 11/486,809

(22) Filed: Jul. 14, 2006

(65) Prior Publication Data

US 2008/0014920 A1    Jan. 17, 2008

(51) Int. Cl.
    *H04B 17/00* (2006.01)
(52) U.S. Cl. .................... 455/67.11; 455/574; 455/450; 455/509; 455/425; 455/511; 370/331; 370/338
(58) Field of Classification Search .................. 455/574, 455/343.3, 450–452.2, 423–425, 509, 67.11; 370/328, 338, 331
See application file for complete search history.

(56) References Cited

U.S. PATENT DOCUMENTS

| | | | | |
|---|---|---|---|---|
| 5,410,538 A * | 4/1995 | Roche et al. | ................ | 370/479 |
| 5,726,978 A * | 3/1998 | Frodigh et al. | ............... | 370/252 |
| 5,867,478 A * | 2/1999 | Baum et al. | ................. | 370/203 |
| 6,016,311 A * | 1/2000 | Gilbert et al. | ................ | 370/280 |
| 6,587,526 B1 * | 7/2003 | Li et al. | ........................ | 375/355 |
| 6,606,498 B2 * | 8/2003 | Chen et al. | ................... | 455/450 |
| 7,047,009 B2 * | 5/2006 | Laroia et al. | ................. | 455/437 |
| 7,463,611 B2 * | 12/2008 | Kuskin | ........................ | 370/338 |
| 7,519,033 B2 * | 4/2009 | Soomro | ....................... | 370/338 |
| 2001/0043578 A1 * | 11/2001 | Kumar et al. | ............... | 370/331 |
| 2002/0086708 A1 * | 7/2002 | Teo et al. | ..................... | 455/561 |
| 2002/0122383 A1 * | 9/2002 | Wu et al. | ..................... | 370/210 |
| 2002/0142766 A1 * | 10/2002 | Iyer | ........................... | 455/423 |
| 2002/0154705 A1 * | 10/2002 | Walton et al. | ................ | 375/267 |

(Continued)

FOREIGN PATENT DOCUMENTS

| | | |
|---|---|---|
| EP | 1487156 | 12/2004 |
| WO | 2007075728 | 7/2007 |

OTHER PUBLICATIONS

Samir Kapoor, Junyi Li: "IEEE C802.20-03/16: Initial Contribution on a System Meeting MBWA Characteristics" IEEE 802.20 Working Group on Mobile Broadband Wireless Access, (Online) Mar. 6, 2003, XP002461101 IEEE 802.20.Session#1 Retrieved from the Internet: URL:www.ieee802.org/20/Contribs/C802.20-03-16.pdf> (retrieved on Dec. 4, 2007).

(Continued)

*Primary Examiner*—Sharad Rampuria
(74) *Attorney, Agent, or Firm*—Donald C. Kordich

(57) ABSTRACT

Systems and methodologies are described that facilitate transitioning between states associated with a wireless terminal. The wireless terminal may transition to and/or from a split-tone on state, which may enable increasing overall user capacity related to a base station or sector. Further, such state transitions may reduce power consumption associated with the wireless terminal.

41 Claims, 17 Drawing Sheets

U.S. PATENT DOCUMENTS

| | | | |
|---|---|---|---|
| 2005/0118981 A1* | 6/2005 | Laroia et al. | 455/343.3 |
| 2006/0285481 A1* | 12/2006 | Lane et al. | 370/208 |
| 2007/0064730 A1* | 3/2007 | Jin et al. | 370/468 |
| 2007/0149131 A1* | 6/2007 | Li et al. | 455/67.11 |
| 2007/0149137 A1* | 6/2007 | Richardson et al. | 455/68 |
| 2007/0149227 A1* | 6/2007 | Parizhsky et al. | 455/509 |
| 2008/0130548 A1* | 6/2008 | Kaikkonen et al. | 370/312 |

OTHER PUBLICATIONS

International Search Report—PCT/US07/073190, International Search Authority, European Patent Office—Dec. 20, 2007.

* cited by examiner

METHODS AND APPARATUS FOR TRANSITIONING BETWEEN STATES

BACKGROUND

I. Field

The following description relates generally to wireless communications, and more particularly to transitioning between states associated with wireless terminals in a wireless communication system.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a wireless terminal. A wireless terminal within the coverage area of such base station can be employed to receive one, more than one, or all the data streams carried by the composite stream. Likewise, a wireless terminal can transmit data to the base station or another wireless terminal.

As wireless communication systems continue to increase in popularity and usage, an escalating number of users may concurrently attempt to employ such wireless communication systems. However, bandwidth over which these wireless communication systems operate is finite. Further, wireless terminals employed in such systems may be constrained by power limitations. Significant power usage in Orthogonal Frequency Division Multiplexing (OFDM) based wireless communication systems may be associated with uplink transmission of reports to base stations. These reports may pertain to, for example, signal quality, data packets to be transferred, and the like. Allocating resources such as a dedicated control channel to a single user may inefficiently provide too many resources to that particular user, when a lesser allocation of resources may suffice supporting operation by that user. Further, when over-allocation occurs, system-wide performance may be negatively impacted since fewer users may employ the system and operation of the wireless terminal may be detrimentally affected due to greater power consumption.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating transitioning between states associated with a wireless terminal. The wireless terminal may transition to and/or from a split-tone on state, which may enable increasing overall user capacity related to a base station or sector. Further, such state transitions may reduce power consumption associated with the wireless terminal.

According to related aspects, a method that facilitates transitioning between wireless terminal states is described herein. The method may comprise utilizing a first state. Further, the method may include transitioning from the first state to a split-tone on state to reduce power consumption associated with the wireless terminal. The method may also include utilizing the split-tone on state.

Another aspect relates to a wireless communications apparatus that may include a memory that retains a state assignment associated with a first state. Further, a processor may utilize the first state, transition to a split-tone on state from the first state to tailor resource utilization to wireless terminal usage, and employ the split-tone on state.

Yet another aspect relates to a wireless communications apparatus that enables transitioning between states associated with a wireless terminal. The wireless communications apparatus may include means for utilizing a first state; means for transitioning to a split-tone on state from the first state to reduce a rate associated with power control; and means for utilizing the split-tone on state.

Still another aspect relates to a machine-readable medium having stored thereon machine-executable instructions for employing a split-tone on state, transitioning from the split-tone on state to a second state, and employing the second state.

In accordance with another aspect, a processor is described herein, wherein the processor may execute instructions for utilizing a first state. Further, the processor may execute instructions for changing to a split-tone on state from the first state in response to receiving a state transition channel segment. Additionally, the processor may execute instructions for utilizing the split-tone on state.

According to a further aspect, a method that facilitates increasing a number of users capable of simultaneously being supported by a base station is described herein. The method may comprise evaluating characteristics of usage related to a wireless terminal in a first state. Additionally, the method may include transitioning the wireless terminal to a split-tone on state from the first state to increase user capacity. Moreover, the method may comprise communicating with the wireless terminal in the split-tone on state.

Another aspect relates to a wireless communications apparatus that may include a memory that retains measured characteristics associated with a wireless terminal. Further, a processor may determine to transition a state associated with the wireless terminal, transmit a state transition channel segment to the wireless terminal indicating to switch to a split-tone on state, receive an acknowledgement from the wireless terminal, and communicate with the wireless terminal in the split-tone on state.

Still another aspect relates to a wireless communications apparatus for controlling base station capacity. The wireless communications apparatus may include means for receiving a request to transition from a first state to a split-tone on state for a wireless terminal, means for transmitting a state transition channel segment to the wireless terminal to change from the first state to the split-tone on state, and means for communicating with the wireless terminal in the split-tone on state.

Yet another aspect relates to a machine-readable medium having stored thereon machine-executable instructions for evaluating available control channel resources; transmitting a state transition channel request to a wireless terminal in a full-tone on state to effectuate transitioning to a split-tone on state; and receiving an acknowledgement from the wireless terminal.

In accordance with another aspect, a processor is described herein, wherein the processor may execute instructions for receiving a request to switch from a first state to a split-tone on state for a wireless terminal, sending a state transition channel segment to the wireless terminal to change from the first state to the split-tone on state, and communicating with the wireless terminal in the split-tone on state.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
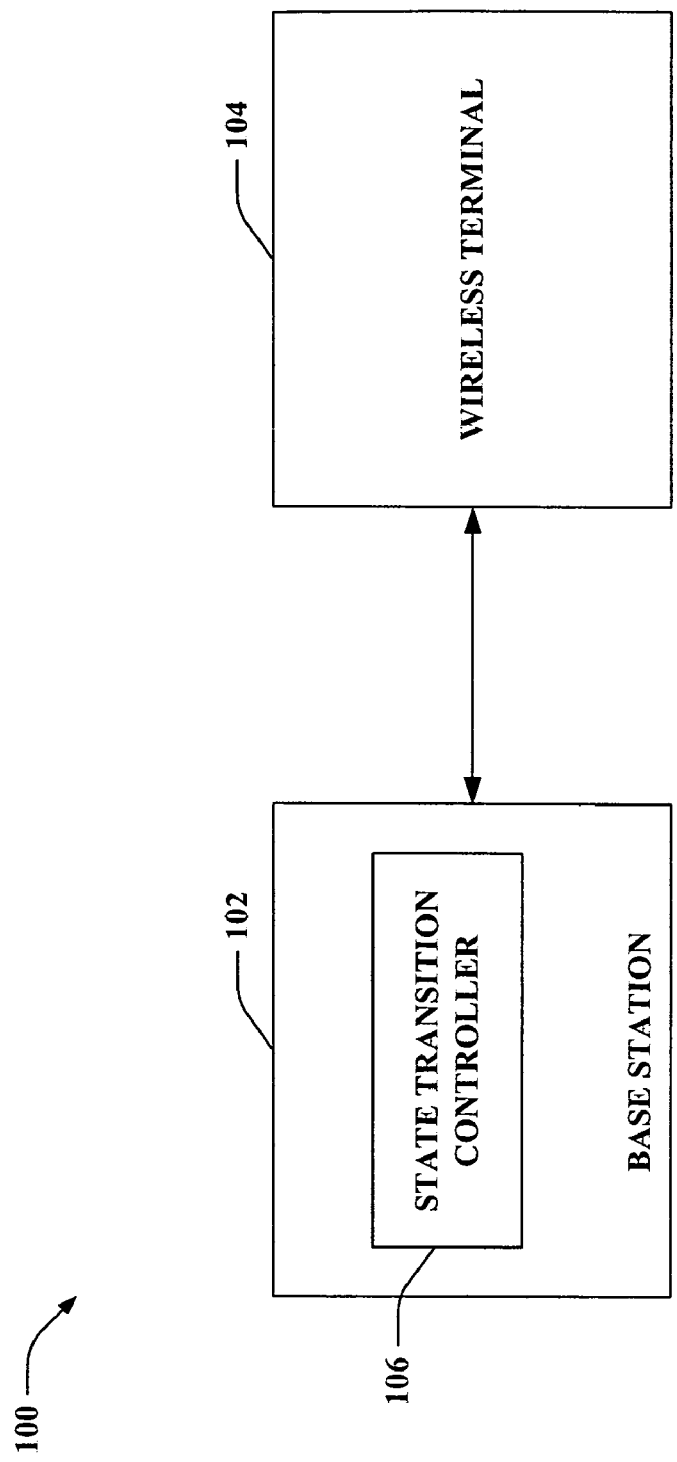
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem.

A base station (e.g., access point) may refer to a device in an access network that communicates over the air-interface, through one or more sectors, with wireless terminals. The base station may act as a router between the wireless terminal and the rest of the access network, which may include an IP network, by converting received air-interface frames to IP packets. The base station also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 can comprise a base station 102 that receives, transmits, repeats, etc., wireless communication signals to a wireless terminal 104. Further, it is contemplated that system 100 may include a plurality of base stations similar to base station 102 and/or a plurality of wireless terminals similar to wireless terminal 104. Base station 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Base station 102 may be a fixed station and/or mobile. Wireless terminal 104 can be, for example, a cellular phone, a smart phone, a laptop, a handheld communication device, a handheld computing device, a satellite radio, a global positioning system, a PDA, and/or any other suitable device for communicating over wireless communication system 100. Also, wireless terminal 104 may be fixed or mobile.

Wireless terminal 104 may communicate with base station 102 (and/or disparate base station(s)) on a downlink and/or an uplink channel at any given moment. The downlink refers to the communication link from base station 102 to wireless terminal 104, and the uplink channel refers to the communication link from wireless terminal 104 to base station 102. Base station 102 may further communicate with other base station(s) and/or any disparate devices (e.g., servers) (not shown) that may perform functions such as, for example, authentication and authorization of wireless terminal 104, accounting, billing, and so on.

Base station 102 may include a state transition controller 106 that may enable wireless terminal 104 to transition between various states. For example, system 100 may support a full-tone on state, a split-tone on state, a hold state, a sleep state, an access state, and a null state. The full-tone on state may be associated with a channel such as, for instance, a dedicated control channel (DCCH) utilized in connection with Orthogonal Frequency Division Multiplexing (OFDM) being continuously allocated to a wireless terminal (e.g., wireless terminal 104). The full-tone on state may be associated with power control that occurs at a high frequency (e.g., several hundred times per second). Also, timing control may be utilized with the fall-tone on state; the timing control may occur at a lower rate as compared to the power control (e.g., once a second) for the full-tone on state.

The split-tone on state may relate to a dedicated control channel being split between N wireless terminals, where N may be any integer (e.g., split between three disparate wireless terminals). For the split-tone on state, the channel may be allocated to disparate wireless terminals in any manner. Pursuant to an illustration, every Nth DCCH segment may be allocated to a particular wireless terminal, where the segments may be evenly spaced in time. It is to be appreciated that all of the segments need not be assigned to corresponding wireless terminals. Further, a first wireless terminal may be allocated a greater number of segments than a second wireless terminal (e.g., ⅔ of the DCCH segments for the first wireless terminal and ⅓ of the DCCH segments for the second wireless terminal for a particular DCCH). According to another example, the segments assigned to wireless terminals may be staggered in any different manner (e.g., if split between three disparate wireless terminals, a first and third segment may be provided to a first wireless terminal, a second and fifth segment may be provide to a second wireless terminal, and a fourth and sixth segment may be provided to a third wireless terminal which may be repeated). It is contemplated that any manner of staggering dedicated control channel segments assigned to multiple wireless terminals is intended to fall within the scope of the appended claims.

Wireless terminal 104, while in split-tone on state, performs timing control at the same rate as in full-tone on state. Further, power control on a downlink for wireless terminal 104 in split-tone on state is diminished (e.g., down sampled) as compared to full-tone on state; power control is at an intermediate level for split-tone on state as compared to full-tone on and hold states. Also, a rate associated with DCCH is reduced (e.g., by ⅓ if split between three wireless terminals, on average) for split-tone on state. Moreover, the split-tone on state enables increasing a number of wireless terminals that may be simultaneously supported as compared to full-tone on state. For instance, M wireless terminals may be accommodated in the fill-tone on state; also, the split-tone on state may employ a 1/N split of the full-tone on state, where M and N may be any integers. Accordingly, M×N users may concurrently be supported with the split-tone on state. Pursuant to an example, the full-tone on state may support 31 wireless terminals and the split-tone on state may utilize a ⅓ split and therefore allow for 93 wireless terminals to be employed simultaneously in split-tone on state; however, it is to be appreciated that the claimed subject matter is not so limited and that any number of full-tone on users and any split may be utilized. Also, by employing split-tone on state, system 100 supports more refined data usage packages by allowing this state to be utilized when transitions between hold and full-tone on state generate latencies that impact service (e.g., associated with voice applications) yet the full-tone on state allocates too many resources to wireless terminal 104 due to low bit rates.

While in hold state, wireless terminal 104 may employ timing control and coarse power control (e.g., on a scale similar to timing control). Further, state transition controller 106 may enable contention-free, rapid transition to split-tone on or full-tone on from hold state. The hold state may be further associated with a thin uplink control channel that enables saving power. Also, wireless terminal 104 may receive data traffic in hold state. Additionally, a DCCH may not be employed by wireless terminal 104 while in hold state. Moreover, in sleep state, a large number of wireless terminals may be supported; however, neither power control nor timing control is utilized with these wireless terminals.

By way of illustration, wireless terminal 104 may be in a null state whereby it is not associated with base station 102

(e.g., off, hibernating). Thereafter, wireless terminal 104 may access a system associated with base station 102; thus, state transition controller 106 may enable wireless terminal 104 to enter into an access state such that access signaling may be effectuated between base station 102 and wireless terminal 104. From the access state, state transition controller 106 may allow wireless terminal 104 to switch to a full-tone on state, a split-tone on state, a hold state, or a sleep state. Wireless terminal 104 may shift into sleep state; however, from sleep state, state transition controller 106 may restrict transitions such that wireless terminal 104 returns to access state to shift into full-tone on state, split-tone on state, or hold state. By moving back to the access state, wireless terminal 104 may have to access an active state (e.g., full-tone on, split-tone on, or hold) through a contention based access.

When in full-tone on state, split-tone on state, or hold state, state transition controller 106 facilitates moving between such states with low latency and/or high reliability. According to an example, if wireless terminal 104 is in full-tone on state, state transition controller 106 may shift wireless terminal 104 quickly to split-tone on state or hold state without transitioning through access state. Also, wireless terminal 104 may be in split-tone on state and thereafter move via state transition controller 106 directly into full-tone on state or hold state. Additionally, from hold state, wireless terminal 104 may transition to full-tone on state or split-tone on state. State transition controller 106 may also enable moving into sleep state from full-tone on state, split-tone on state, or hold state; yet, from sleep state, state transition controller 106 may facilitate moving wireless terminal 104 into access state for returning to full-tone on state, split-tone on state, or hold state.

State alterations effectuated by way of state transition controller 106 may occur in response to an evaluation by base station 102. Additionally or alternatively, state changes enabled by state transition controller 106 may be based upon a received indication from wireless terminal 104. Further, state transition controller 106 may operate in response to a signal obtained from any disparate source (e.g., a different base station, a disparate wireless terminal, a server, a monitoring device, etc.).

By employing state transition controller 106 to transition quickly between full-tone on state, split-tone on state, and hold state, resource utilization within system 100 may be optimized. For instance, state transition controller 106 may increase capacity (e.g., number of users/wireless terminals that may concurrently be supported) of system 100 since wireless terminal 104 (and similar wireless terminal(s) within system 100) may move between states with low latency and/or high reliability; also, hold state may support more users than split-tone on state, which in turn may support more users than full-tone on state. Further, state transition controller 106 may facilitate conserving power associated with wireless terminal 104 since wireless terminal 104 may quickly transition between hold state, full-tone on state, and split-tone on state. By way of example, when wireless terminal 104 has a large amount of data to transmit at a high data rate, it may shift or be shifted into full-tone on state via state transition controller 104 and thereafter transition to hold state upon completion of such transmission to mitigate power consumption.

According to another illustration, wireless terminal 104 may be in split-tone on state for a voice user, since a transition from hold state to full tone on state may negatively impact voice latencies. Full-tone on state may be related to wasteful control channel resource consumption for such voice transmissions because voice applications may be associated with a lower data rate. Utilization of split-tone on state, therefore, may be better suited to accommodate such voice applications as compared to full-tone on state and/or hold state.

Figure 2:
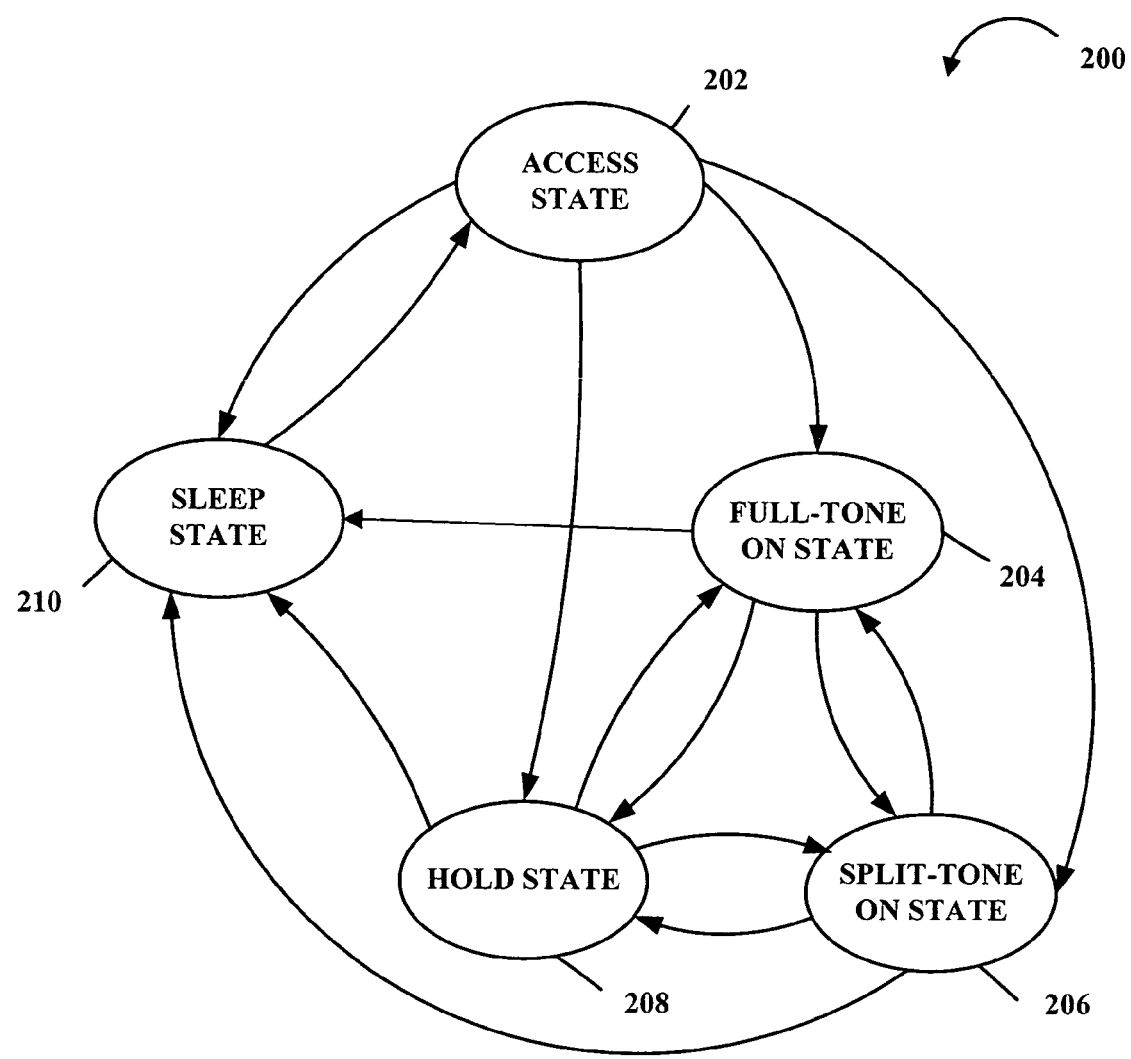
FIG. 2 is an illustration of an exemplary diagram that depicts state transitions associated with wireless terminal(s) that may be effectuated in connection with the claimed subject matter.

With reference to FIG. 2, illustrated is an exemplary diagram 200 that depicts state transitions associated with wireless terminal(s) that may be effectuated in connection with the claimed subject matter. For instance, a state transition controller (e.g., state transition controller 106 of FIG. 1) may enable such state transitions. Also, it is contemplated that state transitions may be base station initiated and/or wireless terminal initiated, and such transitions may be in response to any measured, monitored, determined, or inferred condition.

An access state 202 may be utilized in connection with a wireless terminal accessing a system related to a base station. Although not depicted, it is contemplated that the wireless terminal may be in a null state (e.g., off, hibernate) and may shift to access state 202. From access state 202, the wireless terminal may transition to a full-tone on state 204, a split-tone on state 206, a hold state 208, or a sleep state 210.

The wireless terminal may be in full-tone on state 204, split-tone on state 206, or hold state 208. The wireless terminal may quickly transition between such states without returning to access state 202. Thus, such state changes may be associated with low latency and/or high reliability. Further, communications effectuating transitions between these states may be contention-free. Moreover, the wireless terminal may change from full-tone on state 204, split-tone on state 206, or hold state 208 to sleep state 210. From sleep state 210, the wireless terminal shifts to access state 202 to enable transitioning to full-tone on state 204, split-tone on state 206, or hold state 208.

FIGS. 3-6 illustrate various aspects related to dedicated control channels utilized in connection with a full-tone on state and a split tone on state that may be employed with state transitions. It is to be appreciated that these figures and related descriptions are set forth as examples and the claimed subject matter is not so limited.

Figure 3:
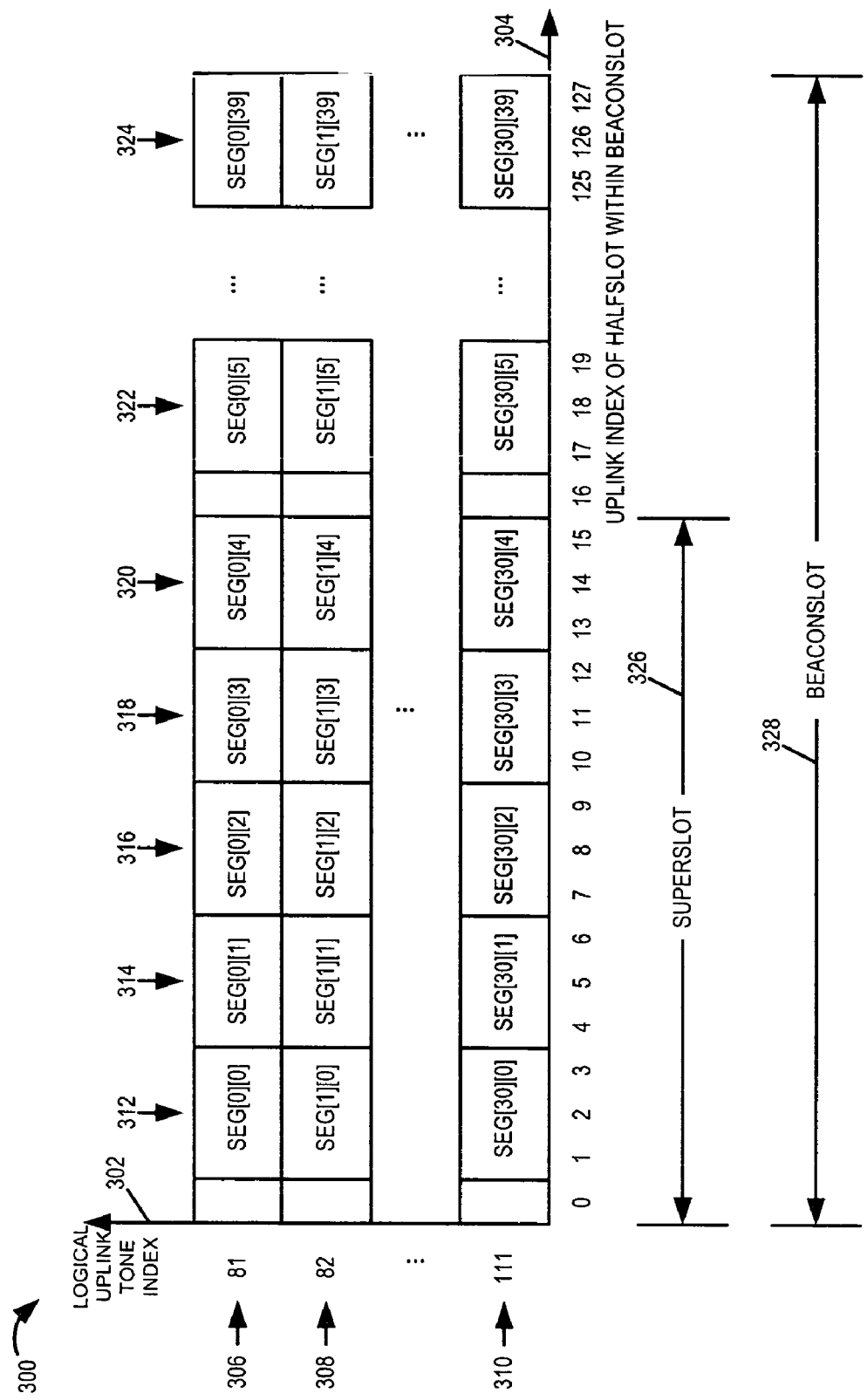
FIG. 3 is an illustration of an exemplary uplink dedicated control channel (DCCH) that includes DCCH segments in an exemplary uplink timing and frequency structure in an exemplary orthogonal frequency division multiplexing (OFDM) multiple access wireless communications system.

Now turning to FIG. 3, illustrated is an exemplary uplink dedicated control channel (DCCH) 300 that includes DCCH segments in an exemplary uplink timing and frequency structure in an exemplary orthogonal frequency division multiplexing (OFDM) multiple access wireless communications system. The uplink dedicated control channel may be used to send Dedicated Control Reports (DCR) from wireless terminals to base stations. Vertical axis 302 plots logical uplink tone index while horizontal axis 304 plots the uplink index of a halfslot within a beaconslot. In this example, an uplink tone block may include 113 logical uplink tones indexed (0, . . . , 112); there may be seven successive OFDM symbol transmission time periods within a halfslot, 2 additional OFDM symbol time periods followed by 16 successive half-slots within a superslot, and 8 successive superslots within a beacon slot. The first 9 OFDM symbol transmission time periods within a superslot may be an access interval, and the dedicated control channel typically does not use the air link resources of the access interval.

The exemplary dedicated control channel may be subdivided into 31 logical tones (uplink tone index 81 306, uplink tone index 82 308, . . . , uplink tone index 111 310). Each logical uplink tone (81, . . . , 111) in the logical uplink frequency structure corresponds to a logical tone indexed with respect to the DCCH channel (0, . . . , 30).

For each tone in the dedicated control channel there may be 40 segments in the beaconslot corresponding to forty columns (312, 314, 316, 318, 320, 322, . . . , 324). The segment structure may repeat on a beaconslot basis. For a given tone in the dedicated control channel there may be 40 segments corresponding to a beaconslot 328; each of the eight superslots of the beaconslot may include 5 successive segments for the given tone. For example, for first superslot 326 of beaconslot 328, corresponding to tone 0 of the DCCH, there may be five indexed segments (segment [0][0], segment [0][1], segment [0][2], segment [0][3], segment [0][4]). Similarly, for first superslot 326 of beaconslot 328, corresponding to tone 1 of the DCCH, there may be five indexed segments (segment [1][0], segment [1][1], segment [1][2], segment [1][3], segment [1][4]). Similarly, for first superslot 326 of beaconslot 328, corresponding to tone 30 of the DCCH, there may be five indexed segments (segment [30][0], segment [30][1], segment [30][2], segment [30][3], segment [30][4]).

In this example, each segment (e.g., segment [0][0]) may comprise one tone for 3 successive half-slots, e.g., representing an allocated uplink air link resource of 21 OFDM tone-symbols. According to various aspects, logical uplink tones may be hopped to physical tones in accordance with an uplink tone hopping sequence such that the physical tone associated with a logical tone may be different for successive half-slots, but remains constant during a given half-slot.

Pursuant to some aspects related to the subject claims, a set of uplink dedicated control channel segments corresponding to a given tone may use one of a plurality of different formats. For example, for a given tone for a beaconslot, the set of DCCH segments may use one of two formats: split-tone format and full-tone format, which may be utilized in connection with split-tone on state and full-tone on state, respectively. In the full tone format, the set of uplink DCCH segments corresponding to a tone may be used by a single wireless terminal. In the split tone format, the set of uplink DCCH segments corresponding to the tone may be shared by more than one wireless terminal. For instance, the set of uplink DCCH segments related to the tone may be shared by up to three wireless terminals in a time division multiplexing manner; however, the claimed subject matter is not so limited. The base station and/or the wireless terminal may, in some aspects, change the format for a given DCCH tone, using predetermined protocols. The format of the uplink DCCH segments corresponding to a different DCCH tone may, for instance, be independently set and may be different.

According to one or more aspects, in either format, the wireless terminal may support a default mode of the uplink dedicated control channel segments. For example, the wireless terminal may support the default mode of the uplink dedicated control channel segments and one or more additional modes of the uplink dedicated control channel segments. Such a mode may define the interpretation of the information bits in the uplink dedicated control channel segments. The base station and/or the wireless terminal may, for example, change the mode (e.g., using an upper layer configuration protocol). Further, the uplink DCCH segments corresponding to a different tone or those corresponding to the same tone but used by different wireless terminals may be independently set and may be different.

Figure 4:
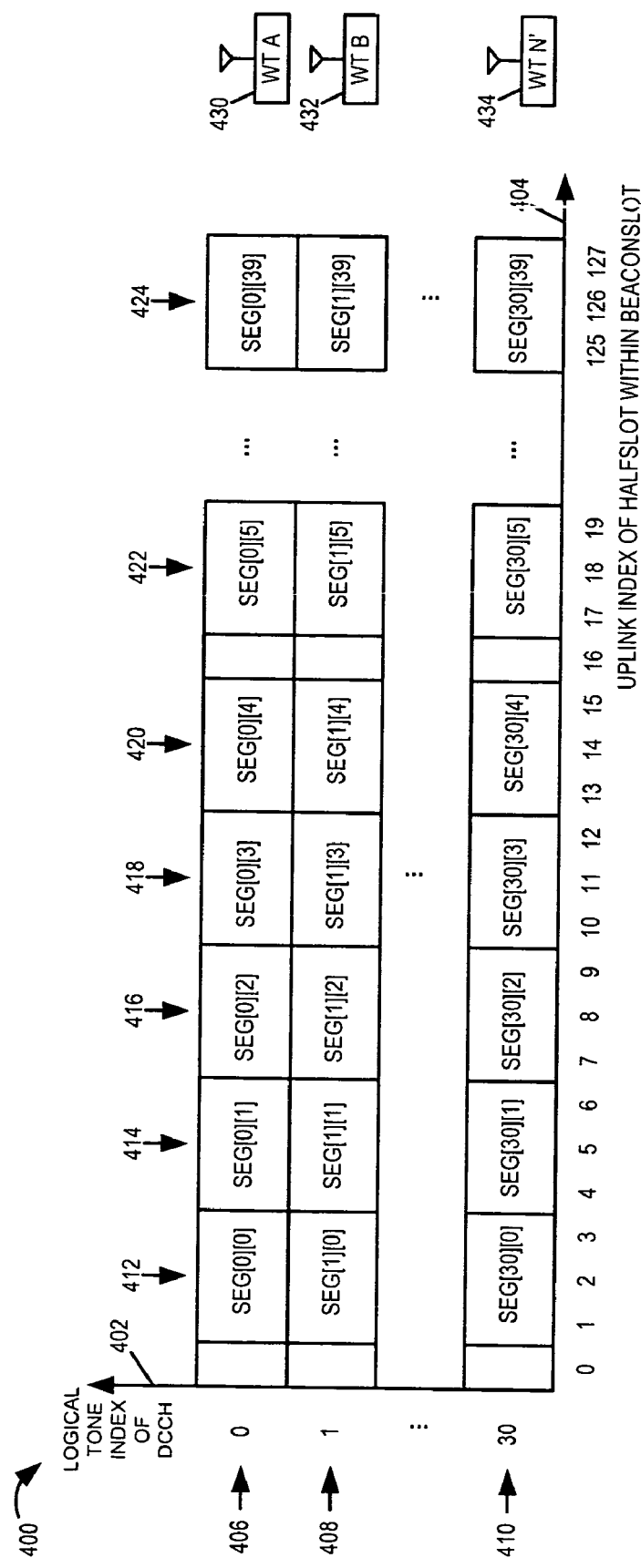
FIG. 4 is an illustration of an exemplary dedicated control channel in an exemplary uplink timing and frequency structure in an exemplary orthogonal frequency division multiplexing (OFDM) multiple access wireless communications system.

FIG. 4 includes an exemplary dedicated control channel 400 in an exemplary uplink timing and frequency structure in an exemplary orthogonal frequency division multiplexing (OFDM) multiple access wireless communications system. For instance, dedicated control channel 400 may represent the DCCH 300 of FIG. 3, at a time when each set of DCCH segments corresponding to a tone is in the full-tone format associated with the full-tone on state. Vertical axis 402 plots logical tone index of the DCCH while horizontal axis 404 plots the uplink index of the halfslot within a beaconslot. The exemplary dedicated control channel 400 may be subdivided into 31 logical tones (tone index 0 406, tone index 1 408, ..., tone index 30 410). For each tone in the dedicated control channel 400, there may be 40 segments in the beaconslot corresponding to forty columns (412, 414, 416, 418, 420, 422, ..., 424). Each logical tone of the dedicated control channel 400 may be assigned by the base station to a different wireless terminal using the base station as its current point of attachment. For example, logical tones (tone 0 406, tone 1 408, ..., tone 30 410) may be currently assigned to corresponding wireless terminals (WTs) (WT A 430, WT B 432, ..., WT N' 434), respectively.

Figure 5:
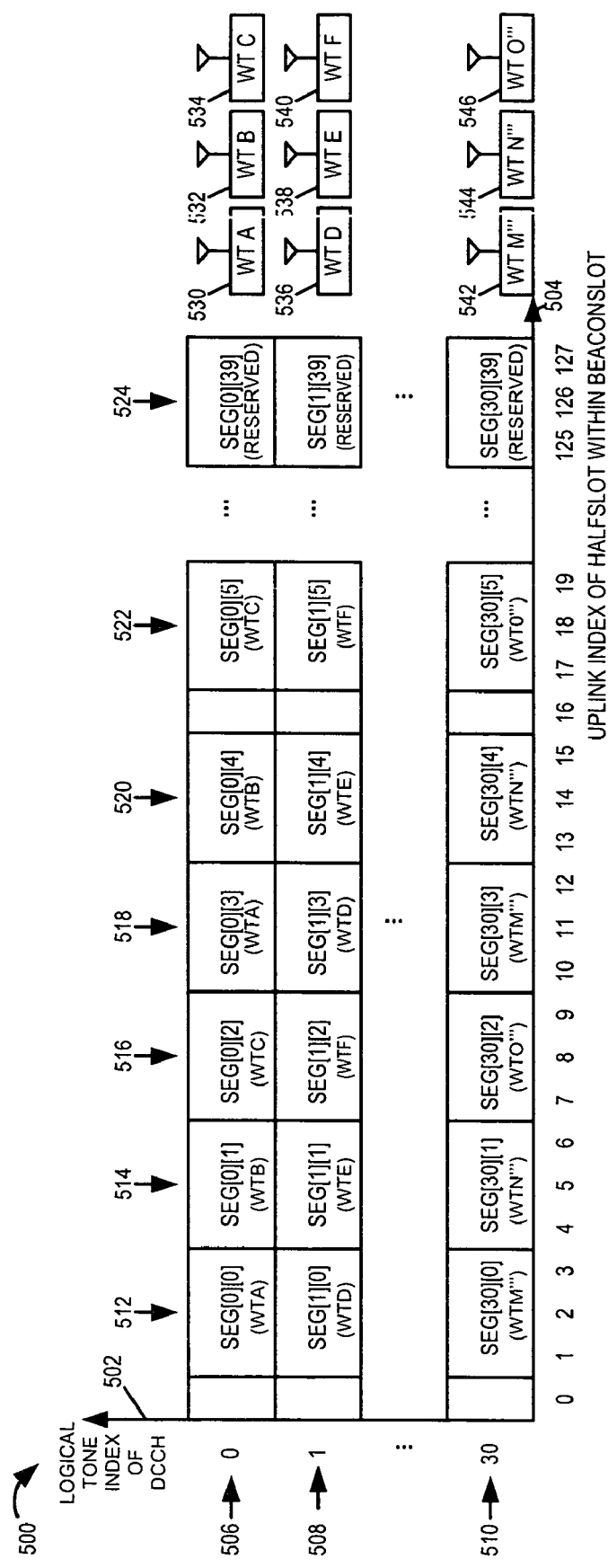
FIG. 5 is an illustration of an exemplary dedicated control channel in an exemplary uplink timing and frequency structure in an exemplary orthogonal frequency division multiplexing (OFDM) multiple access wireless communications system.

FIG. 5 includes an exemplary dedicated control channel 500 in an exemplary uplink timing and frequency structure in an exemplary orthogonal frequency division multiplexing (OFDM) multiple access wireless communications system. For example, dedicated control channel 500 may represent the DCCH 300 of FIG. 3, at a time when each set of DCCH segments corresponding to a tone is in the split-tone format corresponding to the split-tone on state. Vertical axis 502 plots logical tone index of the DCCH while horizontal axis 504 plots the uplink index of the halfslot within a beaconslot. The exemplary dedicated control channel 500 may be subdivided into 31 logical tones (tone index 0 506, tone index 1 508, ..., tone index 30 510). For each tone in the dedicated control channel 500 there may be 40 segments in the beaconslot corresponding to forty columns (512, 514, 516, 518, 520, 522, ..., 524). Each logical tone of the dedicated control channel 500 may be assigned by the base station to up to 3 different wireless terminals using the base station as their current point of attachment. For a given tone, the segments alternate between the three wireless terminals, with 13 segments being allocated for each of the three wireless terminals, and the 40th segment is reserved. It is to be appreciated, however, that the segments may be split amongst disparate wireless terminals in any differing manner and the claimed subject matter is not so limited. This exemplary division of air link resources of the DCCH channel represents a total of 93 different wireless terminals being allocated DCCH channel resources for the exemplary beaconslot. For example, logical tone 0 506 may be currently assigned to and shared by WT A 530, WT B 532, and WT C 534; logical tone 1 508 may be currently assigned to and shared by WT D 536, WT E 538, and WT F 540; logical tone 30 510 may be currently assigned to WT M''' 542, WT N''' 544, and WT 0''' 546. For the beaconslot, each of the exemplary WTs (530, 532, 534, 536, 538, 540, 542, 544, 546) is allocated 13 DCCH segments.

Figure 6:
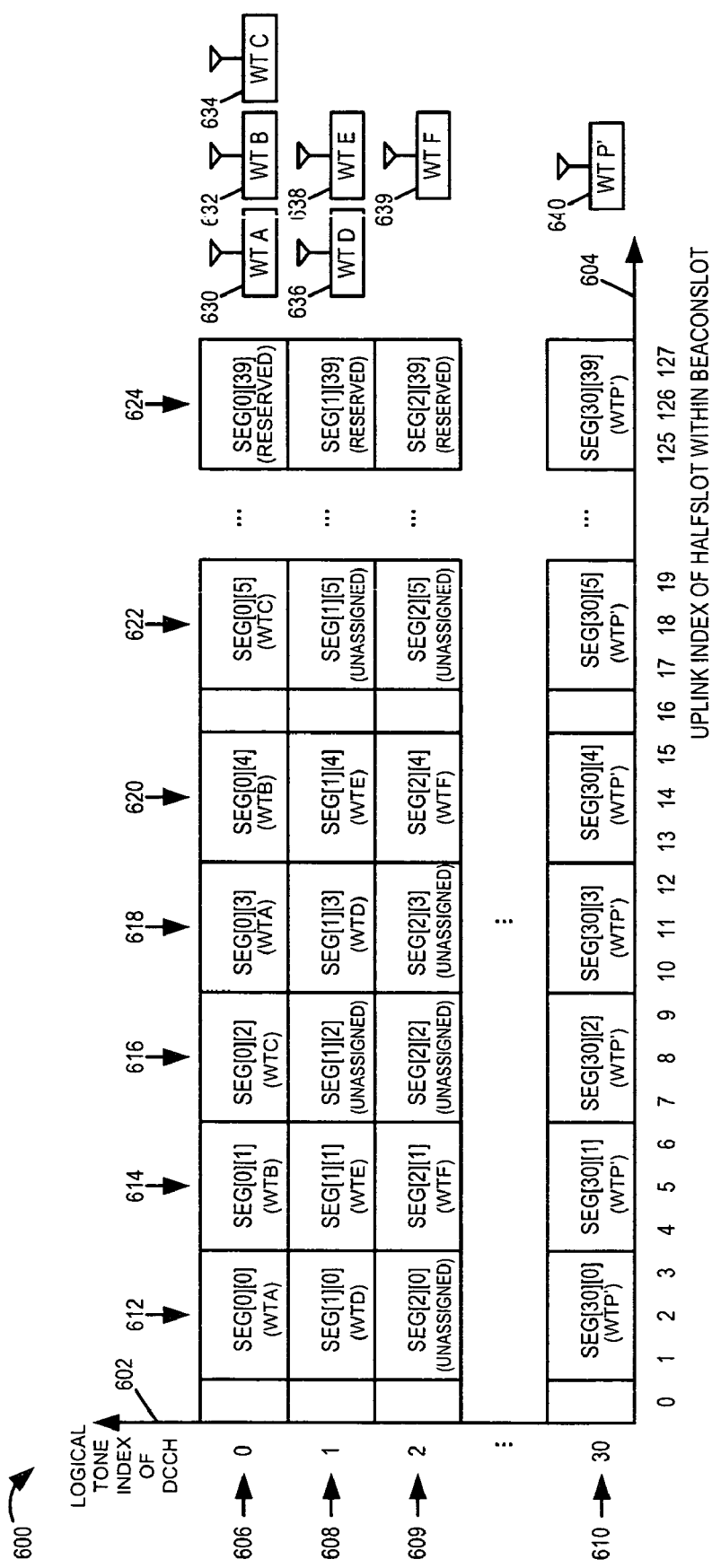
FIG. 6 is an illustration of an exemplary dedicated control channel in an exemplary uplink timing and frequency structure in an exemplary orthogonal frequency division multiplexing (OFDM) multiple access wireless communications system.

FIG. 6 includes an exemplary dedicated control channel 600 in an exemplary uplink timing and frequency structure in an exemplary orthogonal frequency division multiplexing (OFDM) multiple access wireless communications system. Pursuant to an example, the dedicated control channel 600 may represent the DCCH 300 of FIG. 3, at a time when some of the sets of DCCH segments corresponding to a tone may be in the fall-tone format (e.g., related to the full-tone on state) and some of the sets of DCCH segments corresponding to a tone may be in the split-tone format (e.g., associated with the split-tone on state). Vertical axis 602 plots logical tone index of the DCCH while horizontal axis 604 plots the uplink index of the halfslot within a beaconslot. The exemplary dedicated control channel 600 may be subdivided into 31 logical tones (tone index 0 606, tone index 1 608, tone index 2 609, ..., tone index 30 610). For each tone in the dedicated control channel 600 there may be 40 segments in the beaconslot corresponding to forty columns (612, 614, 616, 618, 620, 622, ..., 624). In this example, the set of segments corresponding to logical tone 0 608 is in split-tone format and is currently assigned to and shared by WT A 630, WT B 632, and WT C 634, each receiving 13 segments with one segment being reserved. The set of segments corresponding to logical tone 1 608 is also in split-tone format, but is currently assigned to and shared by two WTs, WT D 636, WT E 638, each receiving 13 segments. For tone 1 608, there may be a set of 13 unassigned segments, and one reserved segment. According to an example, although not depicted, it is to be appreciated that as opposed to being unassigned, such segments of tone 1 608 may be assigned to WT D 636, WT E 638, or any disparate wireless terminal. The set of segments corresponding to logical tone 2 609 is also in split-tone format, but is currently assigned to one WT, WT F 639, receiving 13 segments. For tone 2 609, there are two sets with 13 unassigned segments per set, and one reserved segment. The set of segments corresponding to logical tone 30 610 is in full-tone format and is currently assigned to WT P' 640, with WT P' 640 receiving the full 40 segments to use.

Figure 7:
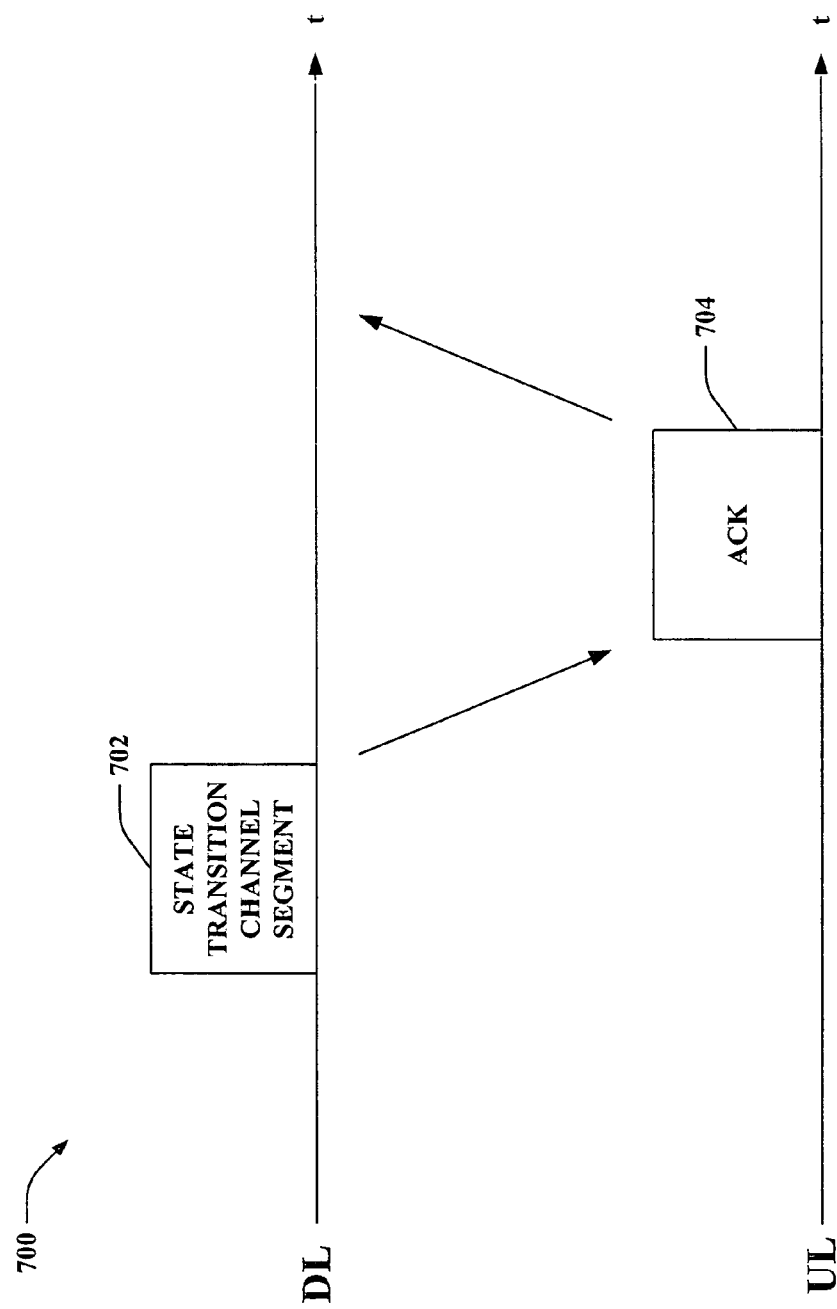
FIG. 7 is an illustration of an exemplary schematic depicting a base station initiated mechanism for transitioning between states.

Turning to FIG. 7, illustrated is an exemplary schematic 700 depicting a base station initiated mechanism for transitioning between states. For instance, schematic 700 may be employed to transition to or from a split-tone on state, a full-tone on state, and/or a hold state. Additionally, while in a sleep state, an access state, or a null state, a wireless terminal may not employ such mechanism to change states; rather, from such states, the wireless terminal may begin a contention based access. By enabling transitions to or from the split-tone on state, schematic 700 may allow wireless terminals to utilize diminished amounts of control channel resources as compared to the full-tone on state. In accordance with the base station initiated mechanism, the base station may determine that a state change associated with a wireless terminal should be effectuated. For instance, the base station may facilitate transitioning a state of the wireless terminal based upon an evaluation of usage, mobility, channel conditions, current number of connected wireless terminals, quality of service profiles (e.g., users associated with different levels of service based upon, for instance, amount of money paid), and the like. At 702, the base station may transmit a state transition channel segment over a downlink (DL) to the wireless terminal. The state transition channel segment may include control information indicating a state to transition to, duration for the transition, a rate associated with a split-tone on state, or any disparate characteristic associated with the transition. For instance, the state transition segment may indicate that the wireless terminal should shift from the hold state to the split-tone on state; however, the claimed subject matter is not so limited. At 704, an acknowledgement (ACK) may be sent back by way of the uplink (UL) from the wireless terminal to the base station. Schematic 700 may additionally be employed to switch a dedicated control channel to which a wireless terminal in split-tone on state is related. For instance, two wireless terminals in split-tone on state may be associated with disparate dedicated control channels, yet neither of the control channels may be shared with other wireless terminals (e.g., unassigned segments within the DCCHs); thus, if a full dedicated control channel is not available for a wireless terminal being transitioned into full-tone on state, one of the wireless terminals in split-tone on state may be relocated to the dedicated control channel associated with the other wireless terminal in split-tone on state utilizing schematic 700.

Figure 8:
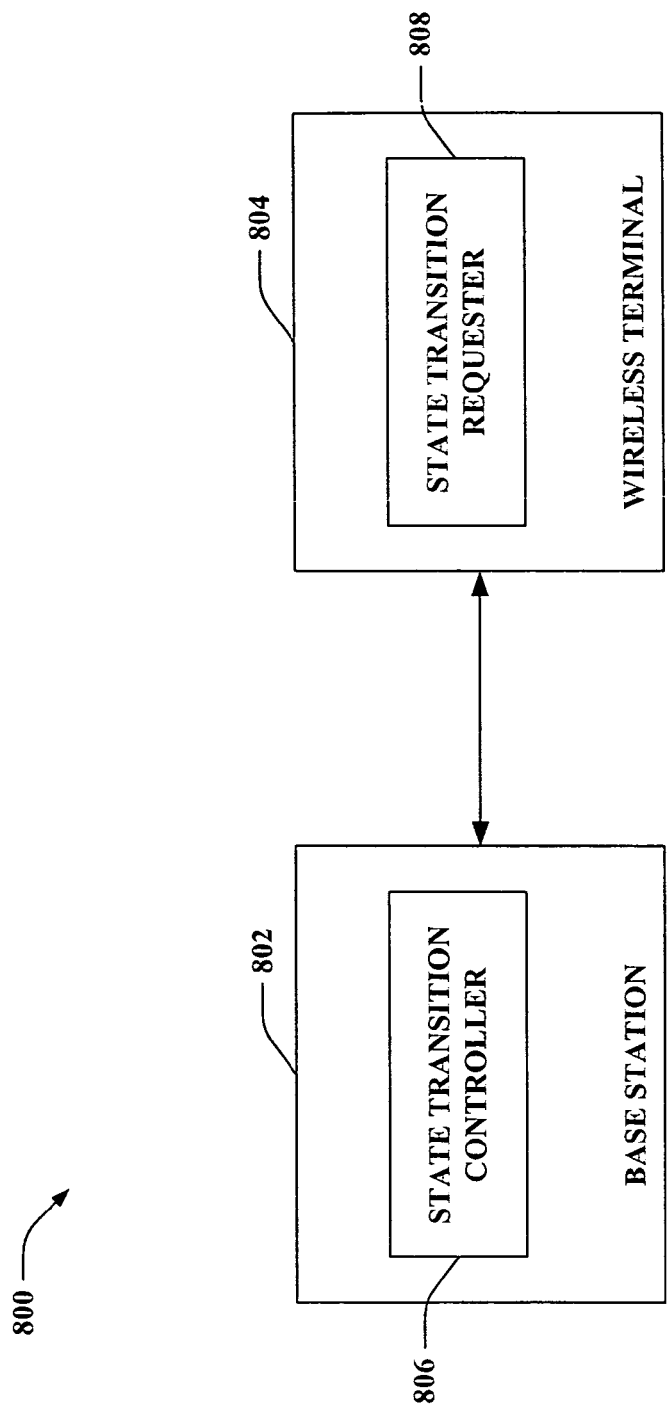
FIG. 8 is an illustration of a system that enables wireless terminal initiated state transitions.

Now referring to FIG. 8, illustrated is a system 800 that enables wireless terminal initiated state transitions. System 800 includes a base station 802 and a wireless terminal 804 that may be in any state. Base station 802 may further comprise a state transition controller 806 that regulates state transitions associated with wireless terminals such as wireless terminal 804. Moreover, wireless terminal 804 may include a state transition requester 808 that requests transitions between states. Wireless terminal 804 and/or state transition requester 808 may determine that a request for a state change should be provided based upon an evaluation of power consumption, data rate, amount of data to be transferred, and the like. State transition requester 808 may communicate with base station 802 and/or state transition controller 806 to effectuate any state transition as described above.

Figure 9:
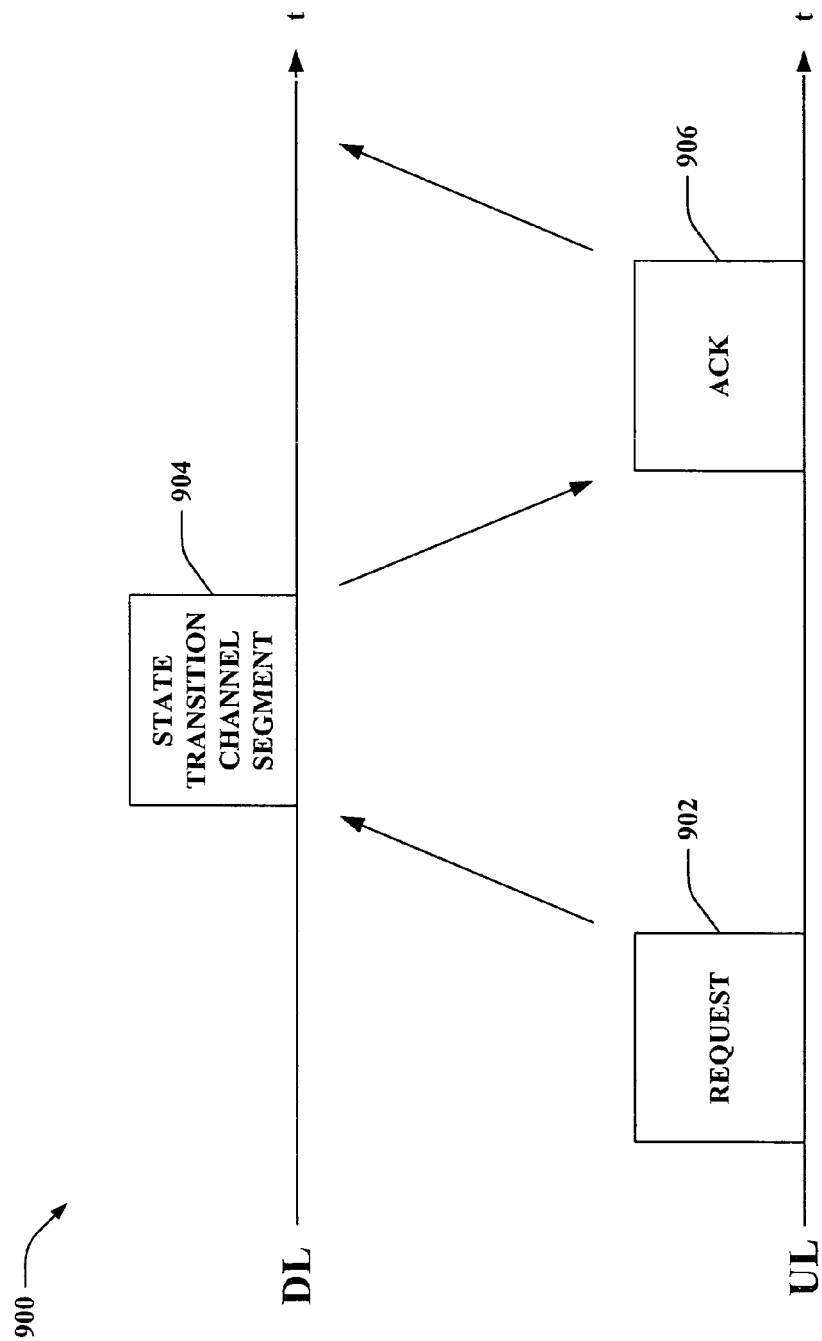
FIG. 9 is an illustration of an exemplary schematic depicting a wireless terminal initiated mechanism for transitioning between states.

With reference to FIG. 9, illustrated is an exemplary schematic 900 depicting a wireless terminal initiated mechanism for transitioning between states. Schematic 900 provides for low latency, high reliability, contention-free changes between active states (e.g., split-tone on state, full-tone on state, hold state). At 902, a request may be transmitted over the uplink from the wireless terminal to the base station. The request may be sent over a request channel; each wireless terminal may be associated with a corresponding request channel related to an active ID. The request may include information such as a state to transition into, duration for the transition, and the like. At 904, a state transition channel segment may be sent over the downlink from the base station to the wireless terminal as described in connection with FIG. 7. Further, an acknowledgement may be sent over the uplink back to the base station at 906 to validate that errors on an air link were not encountered. Moreover, although not depicted, it is contemplated that if a state transition is not granted (e.g., at 904), a retransmitted request (e.g., similar to 902) may be sent over the uplink at a next opportunity and/or any later time.

Figure 10:
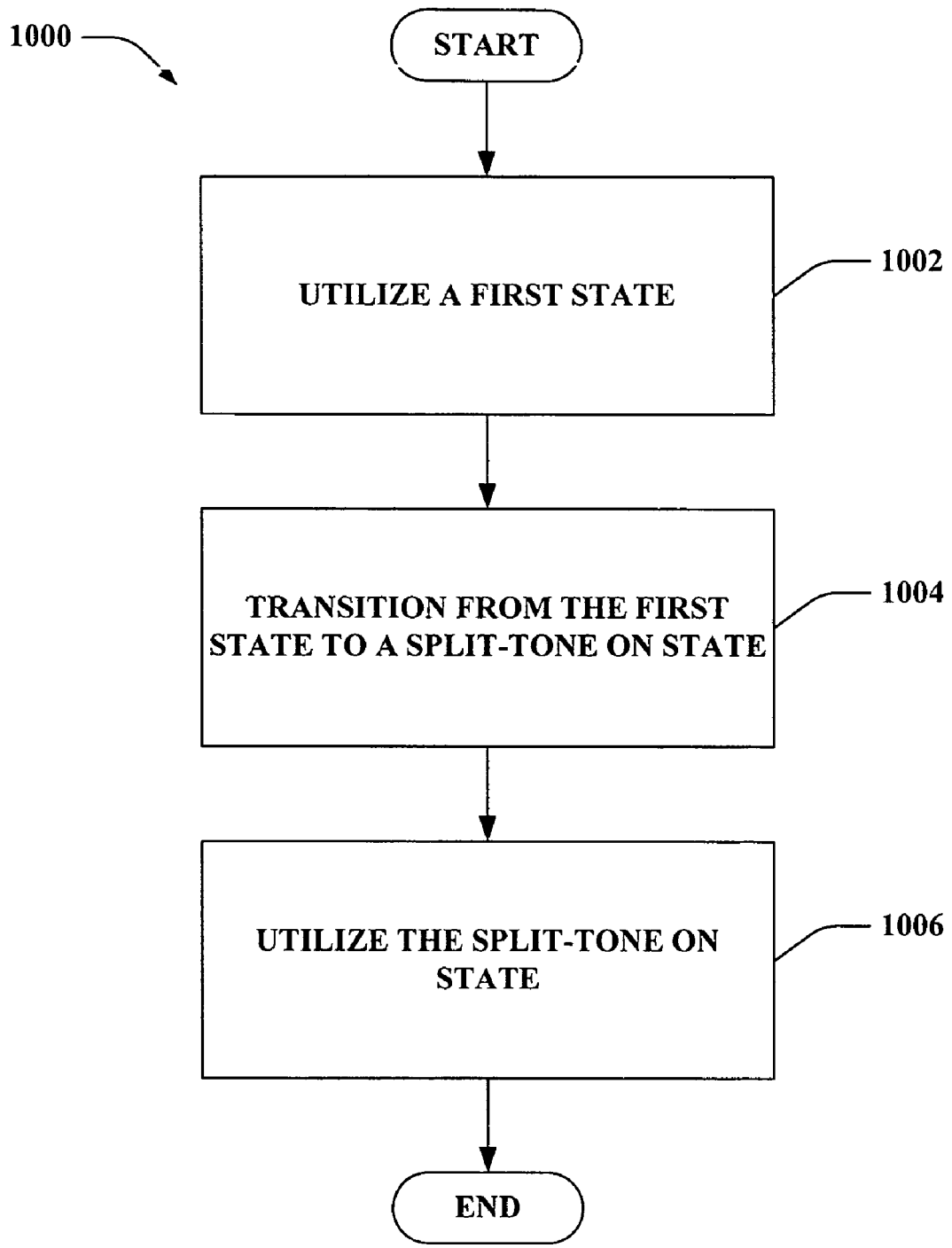
FIG. 10 is an illustration of a methodology that facilitates employing a split-tone on state with a wireless terminal.
Figure 11:
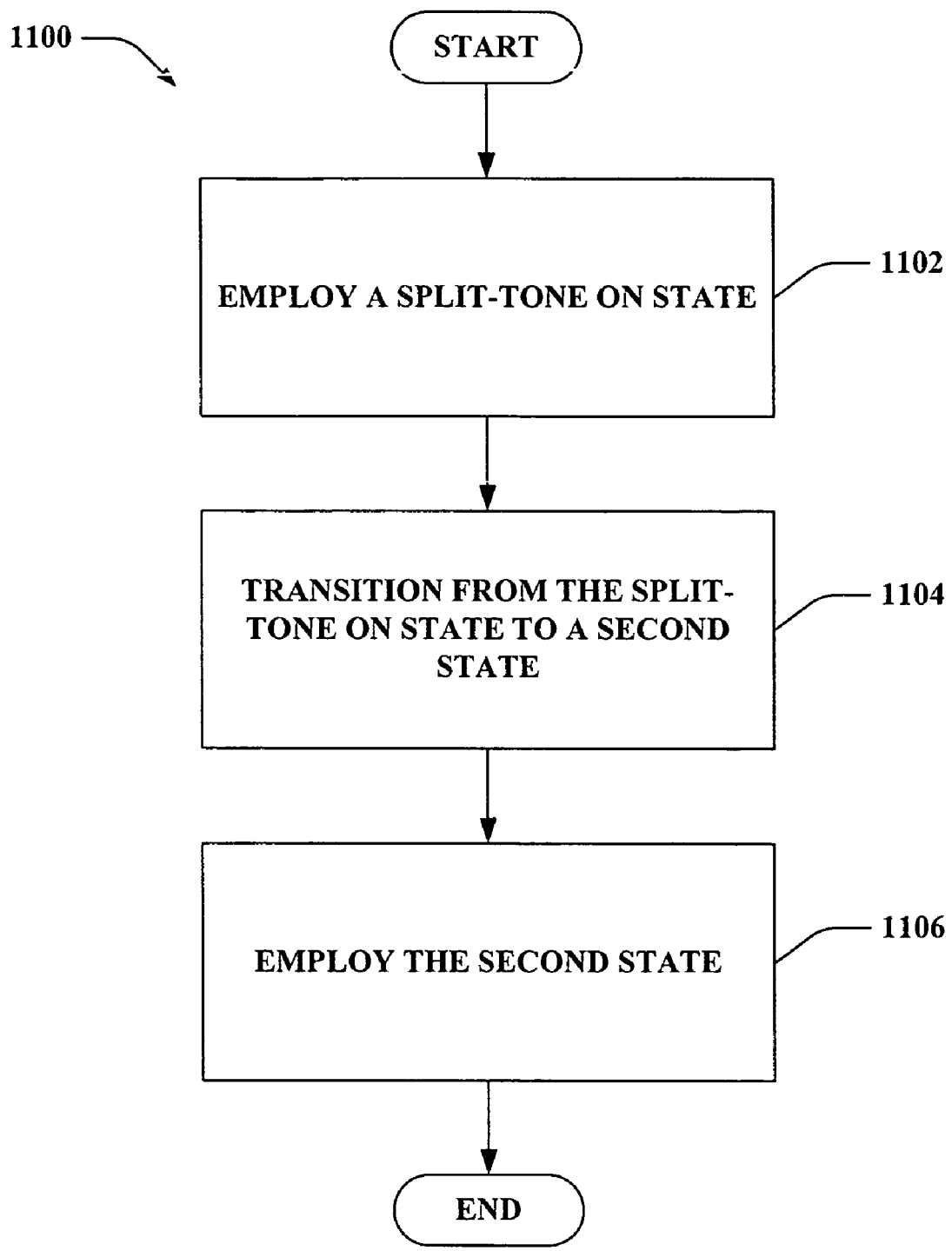
FIG. 11 is an illustration of a methodology that facilitates transitioning from a split-tone on state related to a wireless terminal.
Figure 12:
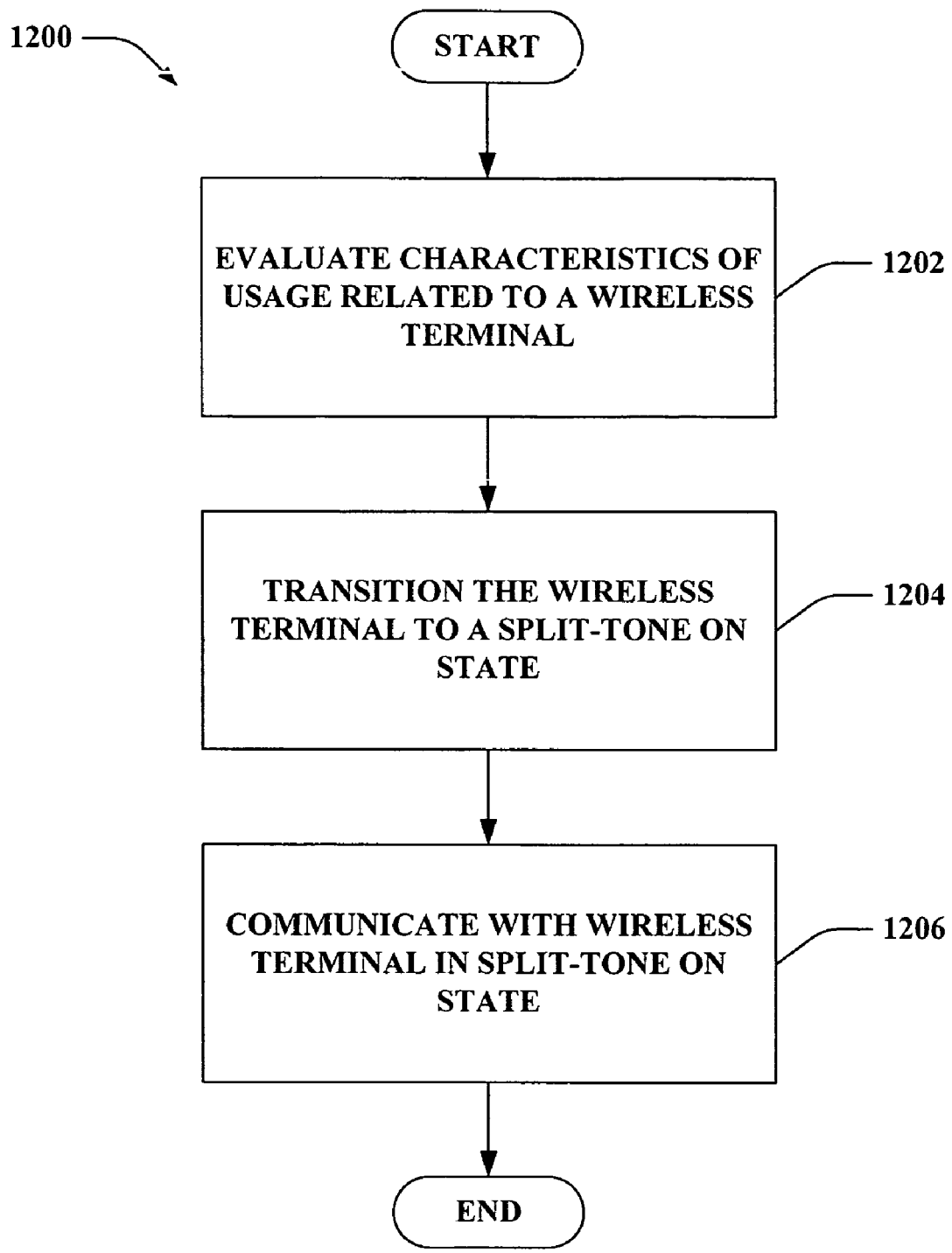
FIG. 12 is an illustration of a methodology that facilitates increasing a number of users capable of simultaneously being within a base station and/or sector.

Referring to FIGS. 10-12, methodologies relating to transitioning between states including a split-tone on state associated with a wireless terminal to increase a number of users that may be services by a sector or base station and/or mitigate power consumption associated with the wireless terminal are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

With reference to FIG. 10, illustrated is a methodology 1000 that facilitates employing a split-tone on state with a wireless terminal. At 1002, a first state may be utilized. The first state may be, for instance, a full-tone on state or a hold state. The full-tone on state may be associated with a full uplink control channel (e.g., DCCH) (which may be utilized for dedicated control channel reports), a high rate associated with power control, and timing control. The hold state may relate to a thin uplink control channel, coarse power control (e.g., on the scale of timing control), and timing control. At 1004, a transition may occur from the first state to a split-tone on state. The transition may be base station initiated and/or wireless terminal initiated. For instance, a base station may transmit a state transition channel segment over the downlink to the wireless terminal indicating that the wireless terminal should transition into the split-tone on state and the wireless terminal may send an acknowledgement back. According to another example, the wireless terminal may transmit a request to the base station, which may thereafter provide the state transition channel segment back to the wireless terminal in response, to which the wireless terminal may transmit an acknowledgement back. The transition may occur with low latency since the transition may be effectuated without returning to an access state associated with contention based access.

The split-tone on state may be associated with a rate related to the uplink control channel lower than the full-tone on state yet greater than the hold state, a diminished rate of power control compared to the full-tone on state but above the power control rate of the hold state, and a similar timing control. At 1006, the split-tone on state may be utilized. By employing the split-tone on state, the wireless terminal may mitigate power consumption as compared to the full-tone on state. For instance, the wireless terminal may inhibit transmission and/or utilization of circuitry associated with transmission during segments (e.g., DCCH segments) not assigned to the wireless terminal. Further, a number of wireless terminals supported by a base station or base station sector may be increased by utilizing the split-tone on state.

Turning to FIG. 11, illustrated is a methodology 1100 that facilitates transitioning from a split-tone on state related to a wireless terminal. At 1102, a split-tone on state may be employed. At 1104, a wireless terminal may be transitioned from the split-tone on state to a second state. For instance, the transition may be base station initiated or wireless terminal initiated. According to an example, the second state may be a full-tone on state or a hold state, and such state change may occur quickly with low latency. Pursuant to a further illustration, the second state may be a sleep state; thus, to return thereafter to the split-tone on state, the wireless terminal moves to an access state and then to the split-tone on state. Also, for instance, the second state may be the split-tone on state; accordingly, this mechanism may allow for reassigning an associated dedicated control channel (e.g., when a full dedicated control channel is desired yet is not free) related to the wireless terminal. At 1106, the second state may be employed.

Now referring to FIG. 12, illustrated is a methodology 1200 that facilitates increasing a number of users capable of simultaneously being supported by a base station and/or sector. At 1202, characteristics of usage related to a wireless terminal in a first state may be evaluated. For instance, the characteristics may include communicated data types, mobility, data usage patterns (e.g., high rate versus low rate), channel conditions (e.g. wireless channel conditions), current number of connected wireless terminals, quality of service profiles (e.g., differential service level(s)), and so forth. By way of example, quality of service profile(s) of wireless terminal(s) may be analyzed to provide differential user treatment by transitioning wireless terminal(s) between states (e.g., full-tone on state, split-tone on state, hold state, etc.). Pursuant to this example, a first wireless terminal may be in a full-tone on state and a second wireless terminal (e.g., associated with a higher service level) may desire to enter the full-tone on state; however, resources may be limited and thus a determination may be effectuated to transition the first wireless terminal to split-tone on state and enable the second wireless terminal to transition to full-tone on state since the second wireless terminal is associated with a higher level of service. Further, a determination may be made to effectuate a change in state associated with the wireless terminal. At 1204, the wireless terminal may be transitioned to a split-tone on state from the first state. For example, a dedicated control channel may be split in any manner, and a portion of the dedicated control channel may be allocated to the wireless terminal. According to an illustration, a number of segments over a period of time may average 1/N, where N may be any integer related to a number of wireless terminals sharing the dedicated control channel. Pursuant to this illustration, assuming that three wireless terminals occupy a dedicated control channel, the segments may be evenly separated for each wireless terminal, or ordered in any disparate manner (e.g., two for the same terminal at a time, random, etc.). At 1206, communication may be effectuated with the wireless terminal in the split-tone on state.

It will be appreciated that, in accordance with one or more aspects described herein, inferences can be made regarding identifying a state to transition a wireless terminal to or an amount of time for utilization of such state. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences regarding selecting a state to transition a wireless terminal to, for example, to decrease power consumption associated with the wireless terminal and/or increase system-wide capacity. By way of further illustration, an inference may be made as to how to split a dedicated control channel for sharing amongst a plurality of wireless terminals. It will be appreciated that the foregoing examples are illustrative in nature and are not intended to limit the number of inferences that can be made or the manner in which such inferences are made in conjunction with the various embodiments and/or methods described herein.

Figure 13:
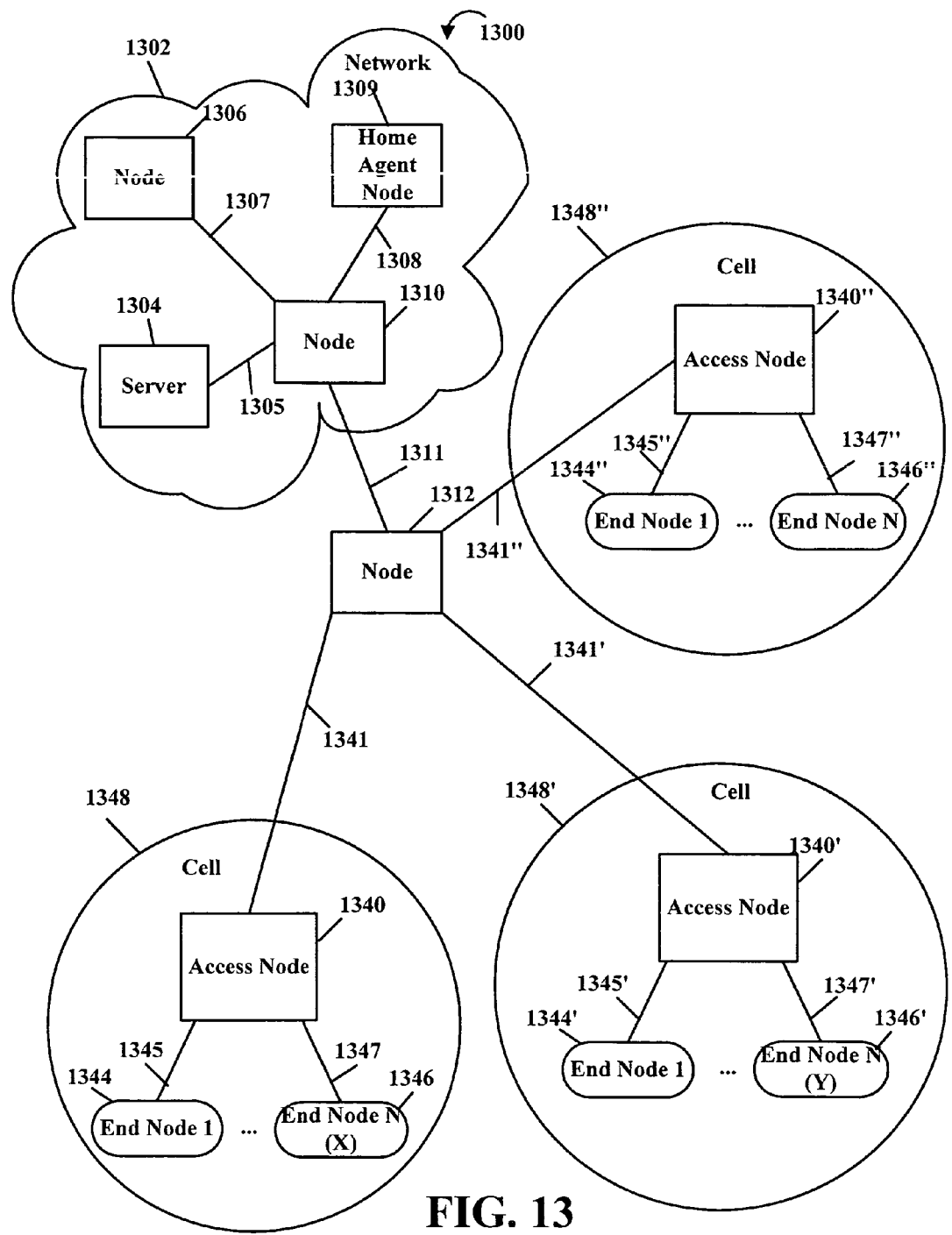
FIG. 13 is an illustration of an exemplary communication system (e.g., a cellular communication network) implemented in accordance with various aspects.

With reference to FIG. 13, illustrated is an exemplary communication system 1300 (e.g., a cellular communication network) implemented in accordance with various aspects, which comprises a plurality of nodes interconnected by communications links. Nodes in exemplary communication system 1300 exchange information using signals (e.g., messages) based on communication protocols (e.g., the Internet Protocol (IP)). The communications links of system 1300 may be implemented, for example, using wires, fiber optic cables, and/or wireless communications techniques. Exemplary communication system 1300 includes a plurality of end nodes 1344, 1346, 1344', 1346', 1344", 1346", which access communication system 1300 via a plurality of access nodes 1340, 1340', and 1340". End nodes 1344, 1346, 1344', 1346', 1344", 1346" maybe, e.g., wireless communication devices or terminals, and access nodes 1340, 1340', 1340" may be, e.g., wireless access routers or base stations. Exemplary communication system 1300 also includes a number of other nodes 1304, 1306, 1309, 1310, and 1312, used to provide interconnectivity or to provide specific services or functions. Specifically, exemplary communication system 1300 includes a Server 1304 used to support transfer and storage of state pertaining to end nodes. The Server node 1304 may be an AAA server a Context Transfer Server, a server including both AAA server functionality and Context Transfer server functionality.

Exemplary communication system 1300 depicts a network 1302 that includes Server 1304, node 1306 and a home agent node 1309, which are connected to an intermediate network node 1310 by corresponding network links 1305, 1307 and 1308, respectively. Intermediate network node 1310 in network 1302 also provides interconnectivity to network nodes that are external from the perspective of network 1302 via network link 1311. Network link 1311 is connected to another intermediate network node 1312, which provides further connectivity to a plurality of access nodes 1340, 1340', 1340" via network links 1341, 1341', 1341", respectively.

Each access node 1340, 1340', 1340" is depicted as providing connectivity to a plurality of N end nodes (1344, 1346), (1344', 1346'), (1344", 1346"), respectively, via corresponding access links (1345, 1347), (1345', 1347'), (1345", 1347"), respectively. In exemplary communication system 1300, each access node 1340, 1340', 1340" is depicted as using wireless technology (e.g., wireless access links) to provide access. A radio coverage area (e.g., communications cells 1348, 1348', and 1348") of each access node 1340, 1340', 1340", respectively, is illustrated as a circle surrounding the corresponding access node.

Exemplary communication system 1300 is presented as a basis for the description of various aspects set forth herein. Further, various disparate network topologies are intended to fall within the scope of the claimed subject matter, where the number and type of network nodes, the number and type of access nodes, the number and type of end nodes, the number and type of Servers and other Agents, the number and type of links, and the interconnectivity between nodes may differ from that of exemplary communication system 1300 depicted in FIG. 13. Additionally, functional entities depicted in exemplary communication system 100 may be omitted or combined. Also, the location or placement of the functional entities in the network may be varied.

Figure 14:
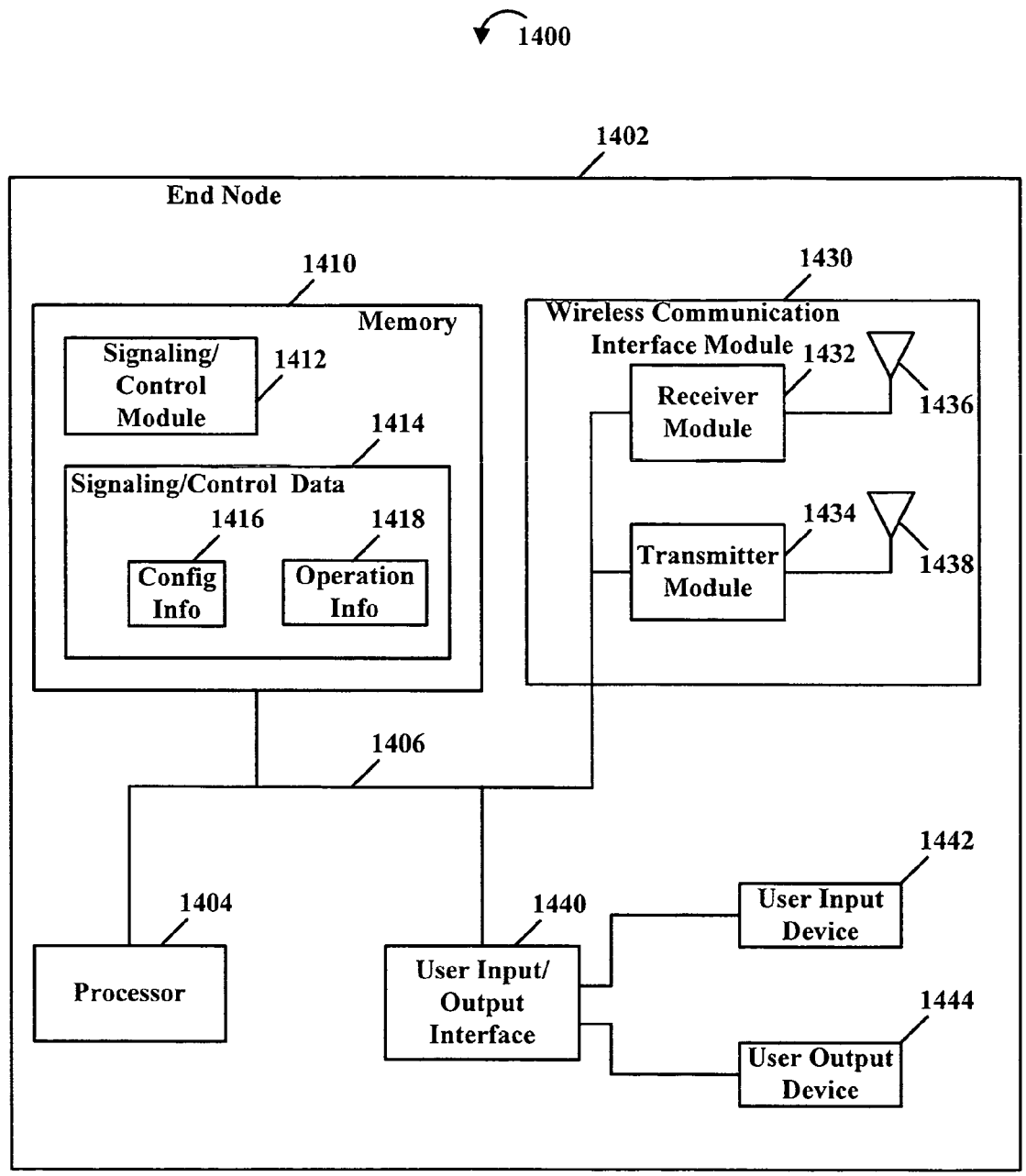
FIG. 14 is an illustration of an exemplary end node (e.g., a mobile node) associated with various aspects.

FIG. 14 illustrates an exemplary end node 1400 (e.g., a mobile node) associated with various aspects. Exemplary end node 1400 may be an apparatus that may be used as any one of the end nodes 1344, 1346, 1344', 1346', 1344", 1346" depicted in FIG. 13. As depicted, end node 1400 includes a processor 1404, a wireless communication interface 1430, a user input/output interface 1440 and memory 1410 coupled together by a bus 1406. Accordingly, various components of end node 1400 can exchange information, signals and data via bus 1406. Components 1404, 1406, 1410, 1430, 1440 of end node 1400 may be located inside a housing 1402.

Wireless communication interface 1430 provides a mechanism by which the internal components of the end node 1400 can send and receive signals to/from external devices and network nodes (e.g., access nodes). Wireless communication interface 1430 includes, for example, a receiver module 1432 with a corresponding receiving antenna 1436 and a transmitter module 1434 with a corresponding transmitting antenna 1438 used for coupling end node 1400 to other network nodes (e.g., via wireless communications channels).

Exemplary end node 1400 also includes a user input device 1442 (e.g., keypad) and a user output device 1444 (e.g., display), which are coupled to bus 1406 via user input/output interface 1440. Thus, user input device 1442 and user output device 1444 can exchange information, signals and data with other components of end node 1400 via user input/output interface 1440 and bus 1406. User input/output interface 1440 and associated devices (e.g., user input device 1442, user output device 1444) provide a mechanism by which a user can operate end node 1400 to accomplish various tasks. In particular, user input device 1442 and user output device 1444 provide functionality that allows a user to control end node 1400 and applications (e.g., modules, programs, routines, functions, etc.) that execute in memory 1410 of end node 1400.

Processor 1404 may be under control of various modules (e.g., routines) included in memory 1410 and may control operation of end node 1400 to perform various signaling and processing as described herein. The modules included in memory 1410 are executed on startup or as called by other modules. Modules may exchange data, information, and signals when executed. Modules may also share data and information when executed. Memory 1410 of end node 1400 may include a signaling/control module 1412 and signaling/control data 1414.

Signaling/control module 1412 controls processing relating to receiving and sending signals (e.g., messages) for management of state information storage, retrieval, and processing. Signaling/control data 1414 includes state information such as, for instance, parameters, status, and/or other information relating to operation of the end node. In particular, signaling/control data 1414 may include configuration information 1416 (e.g., end node identification information) and operational information 1418 (e.g., information about current processing state, status of pending responses, etc.). Signaling/control module 1412 may access and/or modify signaling/control data 1414 (e.g., update configuration information 1416 and/or operational information 1418).

Figure 15:
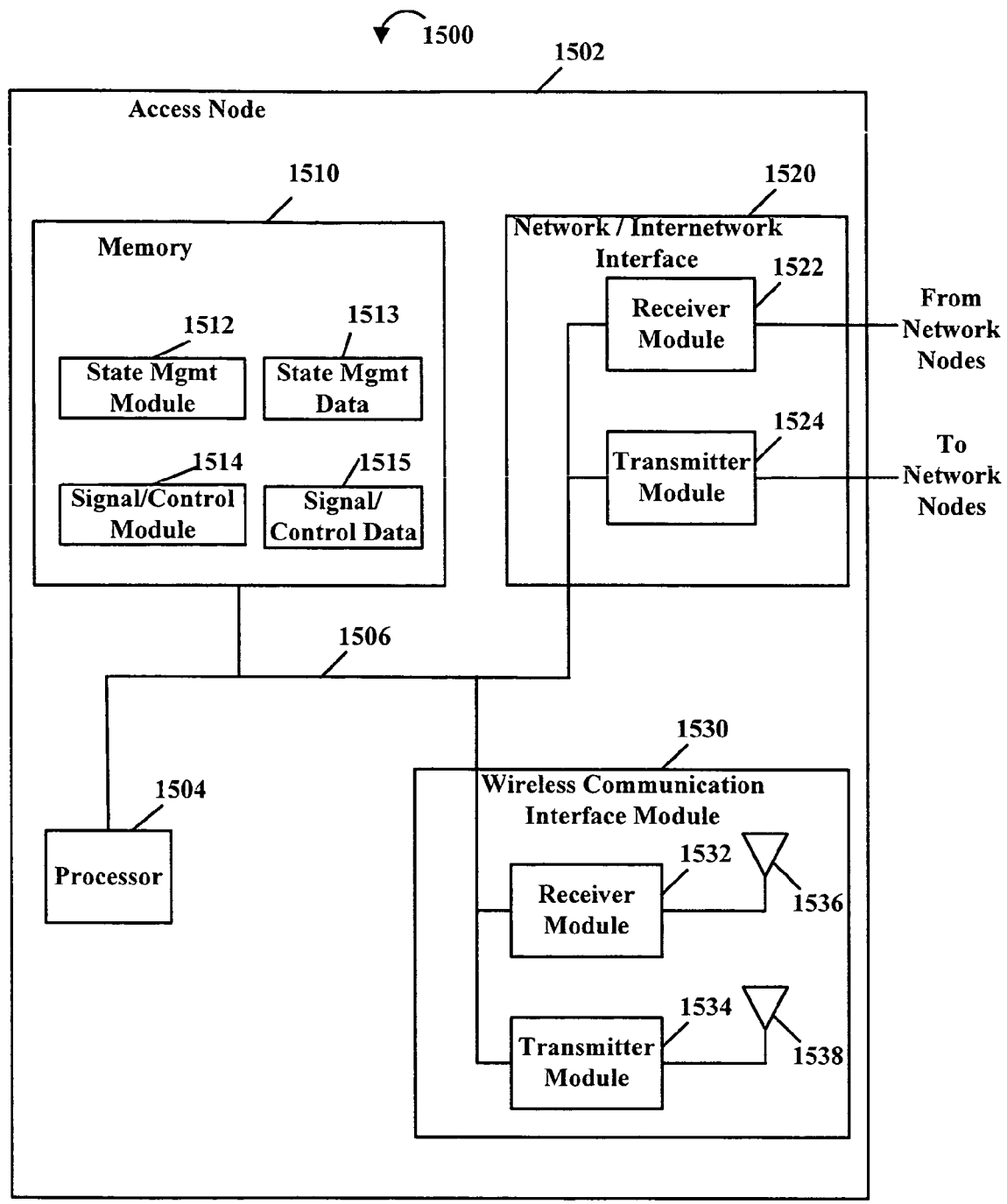
FIG. 15 is an illustration of an exemplary access node implemented in accordance with various aspects described herein.

FIG. 15 provides an illustration of an exemplary access node 1500 implemented in accordance with various aspects described herein. Exemplary access node 1500 may be an apparatus utilized as any one of access nodes 1340, 1340', 1340" depicted in FIG. 13. Access node 1500 includes a processor 1504, memory 1510, a network/internetwork interface 1520 and a wireless communication interface 1530, coupled together by a bus 1506. Accordingly, various components of access node 1500 can exchange information, signals and data via bus 1506. The components 1504, 1506, 1510, 1520, 1530 of the access node 1500 may be located inside a housing 1502.

Network/internetwork interface 1520 provides a mechanism by which the internal components of access node 1500 can send and receive signals to/from external devices and network nodes. Network/internetwork interface 1520 includes a receiver module 1522 and a transmitter module 1524 used for coupling access node 1500 to other network nodes (e.g., via copper wires or fiber optic lines). Wireless communication interface 1530 also provides a mechanism by which the internal components of access node 1500 can send and receive signals to/from external devices and network nodes (e.g., end nodes). Wireless communication interface 1530 includes, for instance, a receiver module 1532 with a corresponding receiving antenna 1536 and a transmitter module 1534 with a corresponding transmitting antenna 1538. Wireless communication interface 1530 may be used for coupling access node 1500 to other network nodes (e.g., via wireless communication channels).

Processor 1504 under control of various modules (e.g., routines) included in memory 1510 controls operation of access node 1500 to perform various signaling and processing. The modules included in memory 1510 may be executed on startup or as called by other modules that may be present in memory 1510. Modules may exchange data, information, and signals when executed. Modules may also share data and information when executed. By way of example, memory 1510 of access node 1500 may include a State Management module 1512 and a Signaling/Control module 1514. Corresponding to each of these modules, memory 1510 also includes State Management data 1513 and the Signaling/Control data 1515.

State Management Module 1512 controls the processing of received signals from end nodes or other network nodes regarding state storage and retrieval. State Management Data 1513 includes, for instance, end-node related information such as the state or part of the state, or the location of the current end node state if stored in some other network node. State Management module 1512 may access and/or modify State Management data 1513.

Signaling/Control module 1514 controls the processing of signals to/from end nodes over wireless communication interface 1530 and to/from other network nodes over network/ internetwork interface 1520 as necessary for other operations such as basic wireless function, network management, etc. Signaling/Control data 1515 includes, for example, end-node related data regarding wireless channel assignment for basic operation, and other network-related data such as the address of support/management servers, configuration information for basic network communications. Signaling/Control module 1514 may access and/or modify Signaling/Control data 1515.

Figure 16:
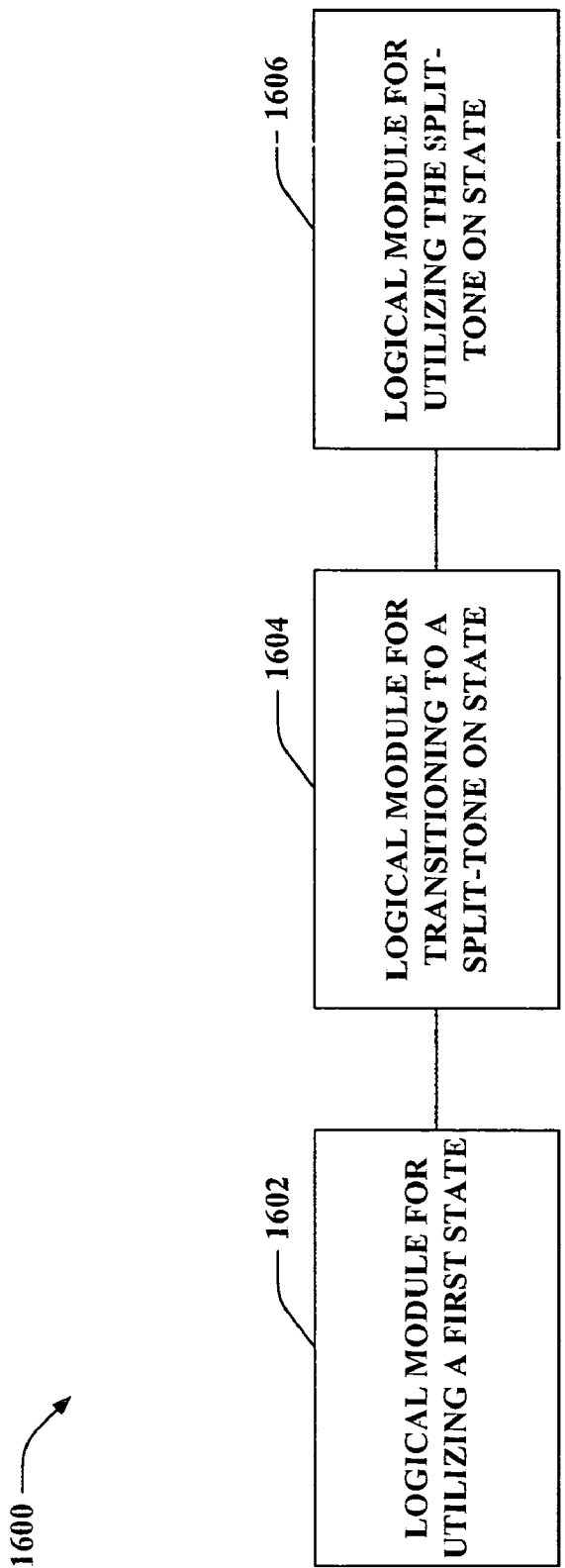
FIG. 16 is an illustration of a system that enables transitioning between states associated with a wireless terminal.

With reference to FIG. 16, illustrated is a system 1600 that enables transitioning between states associated with a wireless terminal. It is to be appreciated that system 1600 is represented as including functional blocks, which can be functional blocks that represent functions implemented by a processor, software, or combination thereof (e.g., firmware). System 1600 can be implemented in a wireless terminal and can include a logical module for utilizing a first state 1602. For instance, the first state may be a full-tone on state or a hold state. Further, system 1600 may include a logical module for transitioning to a split-tone on state 1604. Pursuant to an illustration, the transition may be a low latency, high reliability, contention-free transition. Moreover, system 1600 may include a logical module for utilizing the split-tone on state 1606.

Figure 17:
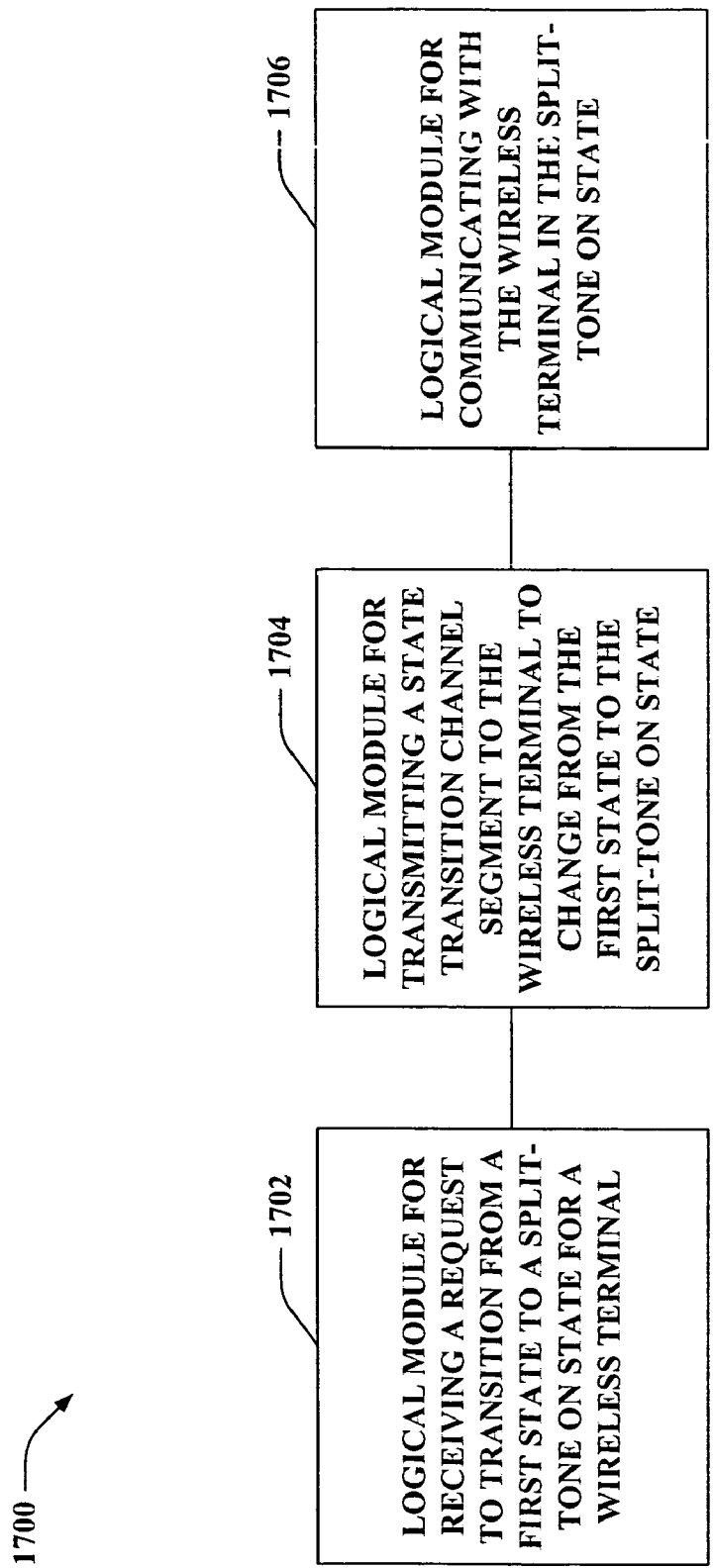
FIG. 17 is an illustration of a system that facilitates controlling base station capacity.

Now referring to FIG. 17, illustrated is a system 1700 that facilitates controlling base station capacity. System 1700 is represented as including functional blocks, which may represent functions implemented by a processor, software, or combination thereof (e.g., firmware). System 1700 may be implemented in a base station and may include a logical module for receiving a request to transition from a first state to a split-tone on state for a wireless terminal 1702. Additionally or alternatively, a logical module (not shown) may determine whether to transition the wireless terminal from the first state to the split-tone on state. The first state, for instance, may be a full-tone on state, a hold state, a sleep state, an access state, and/or a null state. System 1700 may also include a logical module for transmitting a state transition channel segment to the wireless terminal to change from the first state to the split-tone on state 1704. By way of illustration, an acknowledgment may be obtained in response to the transmitted state transition channel segment. Further, system 1700 may comprise a logical module for communicating with the wireless terminal in the split-tone on state 1706.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates transitioning between wireless terminal states, comprising:
   utilizing a first state whereby the wireless terminal utilizes all segments comprising a beaconslot of a tone of an uplink dedicated control channel (DCCH) to transmit control information;
   transitioning from the first state to a split-tone on state whereby the wireless terminal utilizes an assigned subset of the segments composing the beaconslot to transmit the control information to reduce power consumption associated with the wireless terminal, the subset being less than a total number of segments comprising the beaconslot; and
   utilizing the split-tone on state;
   wherein the first state is a hold state and the wireless terminal directly transitions from the hold state to the split-tone on state;
   wherein the split-tone on state is associated with at least one of a rate related to the uplink dedicated control channel greater than a rate associated with the hold state and or a rate of power control greater than that of the hold state.

2. The method of claim 1, wherein the first state is a full-tone on state and the transitioning is effectuated without transitioning through an access state.

3. The method of claim 2, wherein the split-tone on state is associated with at least one of a rate related to the uplink dedicated control channel lower than a rate associated with the full-tone on state or a diminished rate of power control as compared to the full-tone on state.

4. The method of claim 1, wherein the first state is a sleep state and the transitioning includes transitioning through an access state.

5. The method of claim 1, wherein the transitioning is base station initiated.

6. The method of claim 1, wherein the transitioning is wireless terminal initiated.

7. The method of claim 1, wherein the split-tone on state employs a 1/N split of segments comprising the beaconslot, where N is an integer.

8. The method of claim 7, wherein the split-tone on state utilizes a ⅓ split of the the segments comprising the beaconslot and supports three wireless terminals on the uplink dedicated control channel.

9. The method of claim 1, wherein utilizing the split-tone on state further comprises inhibiting transmission and utilization of associated circuitry during segments not assigned to the wireless terminal.

10. A wireless communications apparatus, comprising:
    a memory that retains a state assignment associated with a first state, the first state causing the wireless apparatus to utilize all segments comprising a beaconslot of a tone of an uplink dedicated control channel (DCCH) to transmit control information; and
    a processor that utilizes the first state, transitions to a split-tone on state from the first state to tailor resource utilization to wireless terminal usage, and employs the split-tone on state the split-tone state causing the wireless apparatus to utilize an assigned subset of the segments comprising the beaconslot to transmit the control information, the subset being less than a total of all segments comprising the beaconslot;
    wherein the first state is a hold state and the wireless terminal directly transitions from the hold state to the split-tone on state;

wherein the split-tone on state is associated with at least one of a rate related to the uplink dedicated control channel greater than a rate associated with the hold state and or a rate of power control greater than that of the hold state.

11. The wireless communications apparatus of claim 10, wherein the processor changes from the first state to the split-tone on state via a contention-free transition, the first state being at least one of a full-tone on state or a hold state.

12. The wireless communications apparatus of claim 10, wherein the processor transitions to the split-tone on state by transmitting a request to a base station via the uplink.

13. The wireless communications apparatus of claim 10, wherein the processor transitions to the split-tone on state upon receipt of a state transition channel segment via a downlink.

14. A wireless communications apparatus that enables transitioning between states associated with a wireless terminal, comprising:
means for utilizing a first state to transmit control information using all segments comprising a beaconslot of a tone of an uplink dedicated control channel (DCCH);
means for transitioning from the first state to a split-tone on state from that causes the wireless transmitter to transmit the control information using an assigned subset of the segments less than a total of all segments comprising the beaconslot to reduce a rate associated with power control; and
means for utilizing the split-tone on state;
wherein the first state is a hold state and the wireless terminal directly transitions from the hold state to the split-tone on state;
wherein the split-tone on state is associated with at least one of a rate related to the uplink dedicated control channel greater than a rate associated with the hold state and or a rate of power control greater than that of the hold state.

15. The wireless communications apparatus of claim 14, wherein the first state is at least one of a full-tone on state, a hold state, or the split-tone on state, and transitioning is performed without transitioning through an access state.

16. The wireless communications apparatus of claim 14, wherein the transitioning is base station initiated.

17. The wireless communications apparatus of claim 14, wherein the transitioning is wireless terminal initiated.

18. A non-transitory machine-readable medium having stored thereon machine-executable instructions for:
employing a split-tone on state whereby a wireless terminal utilizes an assigned subset of segments comprising a beaconslot of a tone of an uplink dedicated control channel (DCCH) to transmit control channel reports, the subset being less than a total number of segments comprising the beaconslot;
transitioning from the split-tone on state to a second state whereby the wireless terminal utilizes all of the segments comprising the beaconslot to transmit the control channel reports; and employing the second state;
wherein the first state is a hold state and the wireless terminal directly transitions from the hold state to the split-tone on state;
wherein the split-tone on state is associated with at least one of a rate related to the uplink dedicated control channel greater than a rate associated with the hold state and or a rate of power control greater than that of the hold state.

19. The non-transitory machine-readable storage medium of claim 18, wherein the second state is at least one of a full-tone on state, a hold state, or the split-tone on state and the transitioning occurs without transitioning through an access state.

20. The non-transitory machine-readable medium of claim 18, wherein the split-tone on state utilizes a 1/N split of the total number of segments comprising the beaconslot, where N is an integer.

21. A processor that executes the following instructions:
utilizing a first state to transmit channel quality information using all segments comprising a beaconslot of a tone of an uplink dedicated control channel (DCCH);
changing from the first state to a split-tone on state in response to receiving a state transition channel segment; and
utilizing the split-tone on state to transmit the channel quality information using an assigned subset of the segments comprising the beaconslot, the subset being less than a total number of the segments comprising the beaconslot;
wherein the first state is a hold state and the wireless terminal directly transitions from the hold state to the split-tone on state;
wherein the split-tone on state is associated with at least one of a rate related to the uplink dedicated control channel greater than a rate associated with the hold state and or a rate of power control greater than that of the hold state.

22. The processor of claim 21, wherein the first state is at least one of a full-tone on state, a hold state, or the split-tone on state.

23. The processor of claim 22, wherein the processor directly changes to the split-tone on state from the first state without transitioning through an access state.

24. A method that facilitates increasing a number of users capable of simultaneously being supported by a base station, comprising:
communicating with a wireless terminal in a first state using all segments comprising a beaconslot of a tone of a dedicated control channel (DCCH);
evaluating characteristics of usage related to the wireless terminal in the first state;
transitioning the wireless terminal from the first state to a split-tone on state to increase user capacity based on the characteristics of usage; and
communicating with the wireless terminal in the split-tone on state using an assigned subset of the segments comprising the beaconslot, the subset being less than a total number of segments comprising the beaconslot;
wherein the first state is a hold state and the wireless terminal directly transitions from the hold state to the split-tone on state;
wherein the split-tone on state is associated with at least one of a rate related to the uplink dedicated control channel greater than a rate associated with the hold state and or a rate of power control greater than that of the hold state.

25. The method of claim 24, wherein communicating with the wireless terminal in the first state comprises communicating in at least one of a full-tone on state or a hold state.

26. The method of claim 25, wherein the transitioning comprises transitioning without utilizing an access state.

27. The method of claim 24, wherein the transitioning the wireless terminal from the first state to the split-tone on state comprises transitioning from a null state or a sleep state to the split-tone on state via an intermediate access state.

28. The method of claim 24, further comprising effectuating the transitioning based upon an evaluation by a base station of at least one of usage, mobility, channel conditions, a current number of connected wireless terminals, or a quality of service profile.

29. The method of claim 24, further comprising effectuating the transitioning based upon a received request from the wireless terminal.

30. The method of claim 24, wherein evaluating the characteristics of usage comprises analyzing wireless channel conditions.

31. The method of claim 24, wherein evaluating the characteristics of usage comprises evaluating a data usage pattern of the wireless terminal.

32. The method of claim 26, further comprising:
analyzing a quality of service profile associated with the wireless terminal to determine a level of service associated with the wireless terminal;
selectively transitioning between the split-tone on state and a full-tone on state based on the level of service.

33. A wireless communications apparatus, comprising:
a memory that retains measured characteristics associated with a wireless terminal; and
a processor that determines when to transition the wireless terminal from a full-tone on state to a split-tone on state, transmits a state transition channel segment instructing the wireless terminal indicating to switch to the split-tone on state, receives an acknowledgement from the wireless terminal that the switch has been completed, and communicates with the wireless terminal in the split-tone on state;
wherein the full-tone state causes the wireless terminal to transmit Dedicated Control Reports (DCRs) using a total number of segments comprising a beaconslot of a tone of an uplink dedicated control channel (DCCH), and the split-tone on state causes the wireless terminal to transmit DCRs using an assigned subset of the segments less than the total;
wherein the first state is a hold state and the wireless terminal directly transitions from the hold state to the split-tone on state;
wherein the split-tone on state is associated with at least one of a rate related to the uplink dedicated control channel greater than a rate associated with the hold state and or a rate of power control greater than that of the hold state.

34. The wireless communications apparatus of claim 33, wherein the split-tone on state employs a 1/N split of the total number of segments comprising the beaconslot, where N is an integer.

35. A wireless communications apparatus for controlling base station capacity, comprising:
means for receiving a request to transition from a first state to a split-tone on state for a wireless terminal, wherein the first state allows communication with the wireless terminal using all segments comprising a beaconslot of a tone of a dedicated control channel (DCCH);
means for transmitting a state transition channel segment to the wireless terminal to change from the first state to the split-tone on state; and
means for communicating with the wireless terminal in the split-tone on state using an assigned subset of the segments comprising the beaconslot, the assigned subset being less than a total of all segments comprising the beaconslot;
wherein the first state is a hold state and the wireless terminal directly transitions from the hold state to the split-tone on state;
wherein the split-tone on state is associated with at least one of a rate related to the uplink dedicated control channel greater than a rate associated with the hold state and or a rate of power control greater than that of the hold state.

36. The wireless communications apparatus of claim 35, further comprising means for determining whether to transition the wireless terminal from the first state to the split-tone on state.

37. The wireless communications apparatus of claim 35, wherein the means for transitioning comprises means for transitioning from a full-tone on state or a hold state to the split-tone on state without passing through an access state.

38. A non-transitory machine-readable storage medium having stored thereon machine-executable instructions for:
evaluating available control channel resources; transmitting a state transition channel request to a wireless terminal in a full-tone on state to effectuate transitioning to a split-tone on state that causes the wireless terminal to communicate using an assigned subset of segments comprising a beaconslot of a tone of an uplink dedicated control channel (DCCH), the subset being less than a total number of segment comprising the beaconslot; and
receiving an acknowledgement from the wireless terminal that the transitioning was effectuated;
wherein the first state is a hold state and the wireless terminal directly transitions from the hold state to the split-tone on state;
wherein the split-tone on state is associated with at least one of a rate related to the uplink dedicated control channel greater than a rate associated with the hold state and or a rate of power control greater than that of the hold state.

39. The non-transitory machine-readable medium of claim 38, wherein the state transition channel request includes at least one duration for the transition and or a rate associated with the split-tone on state.

40. A processor that executes the following instructions:
receiving a request to switch from a first state to a split-tone on state for a wireless terminal, wherein the first state causes communication with the wireless terminal to be performed using all segments comprising a beaconslot of a tone of a dedicated control channel (DCCH);
sending a state transition channel segment to the wireless terminal to change from the first state to the split-tone on state; and
communicating with the wireless terminal in the split-tone on state using an assigned subset of the segments comprising the beaconslot, the assigned subset being less than a total of all segments comprising the beaconslot;
wherein the first state is a hold state and the wireless terminal directly transitions from the hold state to the split-tone on state;
wherein the split-tone on state is associated with at least one of a rate related to the uplink dedicated control channel greater than a rate associated with the hold state and or a rate of power control greater than that of the hold state.

41. The processor of claim 40, wherein the first state is at least one of a full-tone on state, a hold state, or the split-tone on state.

* * * * *